United States Patent

Bharadwaj et al.

(10) Patent No.: US 10,165,551 B2
(45) Date of Patent: Dec. 25, 2018

(54) RESOURCE ALLOCATION SIGNALING IN A HIGH EFFICIENCY WIRELESS LOCAL AREA NETWORK PREAMBLE

(71) Applicant: QUALCOMM Incorporated, San Diego, CA (US)

(72) Inventors: Arjun Bharadwaj, Poway, CA (US); Bin Tian, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 15/232,711

(22) Filed: Aug. 9, 2016

(65) Prior Publication Data

US 2017/0048823 A1 Feb. 16, 2017

Related U.S. Application Data

(60) Provisional application No. 62/203,857, filed on Aug. 11, 2015.

(51) Int. Cl.
*H04W 72/04* (2009.01)
*H04B 7/0452* (2017.01)
*H04L 27/26* (2006.01)
*H04W 84/12* (2009.01)

(52) U.S. Cl.
CPC .......... *H04W 72/04* (2013.01); *H04B 7/0452* (2013.01); *H04L 27/2608* (2013.01); *H04W 72/042* (2013.01); *H04W 84/12* (2013.01)

(58) Field of Classification Search
CPC ... H04W 72/04; H04W 72/042; H04W 84/12; H04B 7/0452; H04L 27/2608
See application file for complete search history.

(56) References Cited

U.S. PATENT DOCUMENTS

| | | |
|---|---|---|
| 2014/0328249 A1 | 11/2014 | Vermani et al. |
| 2014/0369276 A1 | 12/2014 | Porat et al. |
| 2015/0163028 A1 | 6/2015 | Tandra et al. |

(Continued)

OTHER PUBLICATIONS

IEEE 802.11-15/0821r2 "HE-SIG-B Structure," Jul. 11, 2015, IEEE.*

(Continued)

*Primary Examiner* — Jae Y Lee
(74) *Attorney, Agent, or Firm* — Holland & Hart LLP/Qualcomm

(57) ABSTRACT

A device may signal a resource allocation scheme in a high efficiency wireless local area network (WLAN) preamble. In one example, a high efficiency (HE) WLAN signaling field is used to signal a resource allocation pattern to multiple devices. The HE WLAN signaling field includes a common user field that is decodable by the multiple devices and includes a resource allocation field. The resource allocation indicates resource unit distributions to the multiple devices and indicates which resource units in a multi-user PPDU correspond to multi-user MIMO transmissions and which resource units correspond to OFDMA single-user transmissions. The HE WLAN signaling field also includes dedicated user fields that are assigned to certain devices. The order of the dedicated user fields corresponds to the allocated resource units. The HE WLAN signaling field is transmitted with a WLAN preamble to the multiple devices.

32 Claims, 17 Drawing Sheets

(56) References Cited

U.S. PATENT DOCUMENTS

2016/0330300 A1* 11/2016 Josiam .................... H04L 69/22
2017/0013092 A1* 1/2017 Chen ....................... H04L 5/003

OTHER PUBLICATIONS

ISA/EP, International Search Report and Written Opinion of the International Searching Authority, Int'l Application No. PCT/US2016/046320, dated Oct. 18, 2016, European Patent Office, Rijswijk, NL, 10 pgs.

* cited by examiner

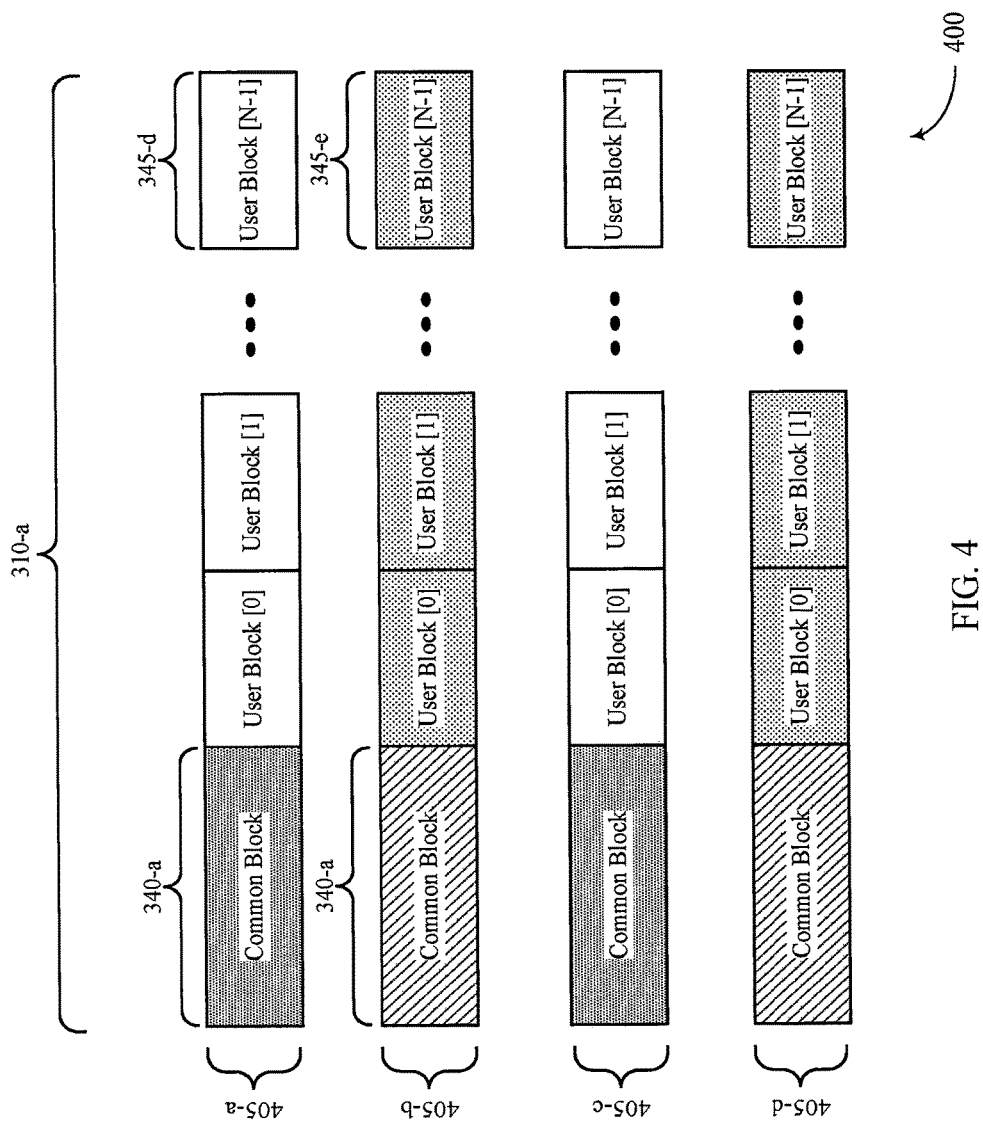

RESOURCE ALLOCATION SIGNALING IN A HIGH EFFICIENCY WIRELESS LOCAL AREA NETWORK PREAMBLE

CROSS REFERENCES

The present Application for Patent claims priority to U.S. Provisional Patent Application No. 62/203,857 by Bharadwaj et al., entitled "Resource Allocation Signaling In A High Efficiency Wireless Local Area Network Preamble," filed Aug. 11, 2015, assigned to the assignee hereof, and expressly incorporated by reference herein.

BACKGROUND

Field of the Disclosure

The present disclosure, for example, relates to wireless communication systems, and more particularly to techniques for resource allocation signaling in a high efficiency wireless local area network (WLAN) preamble.

Description of Related Art

Wireless communications systems are widely deployed to provide various types of communication content such as voice, video, packet data, messaging, broadcast, and so on. These systems can be multiple-access systems capable of supporting communication with multiple users by sharing the available system resources (e.g., time, frequency, and power). A wireless network (e.g., a WLAN, such as a Wi-Fi network conforming to one or more of the IEEE 802.11 family of standards) oftentimes includes an access point (AP) that communicates with one or more stations (STAs) or mobile devices. The AP can oftentimes be coupled to a network, such as the Internet, and may enable a station or mobile device to communicate via the network (and/or communicate with other devices coupled to the AP).

An allocation of resources for a wireless communication can be indicated within a WLAN preamble. Different resource allocation schemes may be used to efficiently use resources and to reduce signaling complexity.

SUMMARY

A device may signal a resource allocation scheme in a high efficiency wireless local area network (WLAN) preamble. In one example, a high efficiency (HE) WLAN signaling field is used to signal a resource allocation pattern to multiple devices. The HE WLAN signaling field includes a common user field that is decodable by the multiple devices and includes a resource allocation field. The resource allocation indicates resource unit distributions to the multiple devices and indicates which resource units in a multi-user physical (PHY) layer protocol data unit (PPDU) correspond to multi-user (MU) multiple input multiple output (MIMO) (MU-MIMO) transmissions and which resource units correspond to orthogonal frequency division multiple access (OFDMA) single-user transmissions. The HE WLAN signaling field also includes dedicated user fields that are assigned to certain devices. The order of the dedicated user fields corresponds to the allocated resource units. The HE WLAN signaling field is transmitted with a WLAN preamble to the multiple devices.

A method for wireless communication at an access point is described. The method includes generating a common user field in a WLAN signaling field, the common user field decodable by a plurality of stations, the common user field comprising a resource allocation field indicating one or more communication resource units in an MU PPDU and further indicating that the one or more communication resource units in a MU-PPDU are associated with an MU-MIMO transmission or an OFDMA single-user transmission; generating, subsequent to the common user field in the WLAN signaling field, at least one station-specific field, wherein a position of the at least one station-specific field corresponds to one of the one or more communication resource units; and transmitting a WLAN preamble that includes the WLAN signaling field.

Generating the common user field can also include generating the resource allocation field to include a first portion and a second portion, each of the first portion and the second portion including an indicator of a type of resource allocation information that is included in the respective first portion and the respective second portion. The indicator can include an allocation plan indicator or a resource type indicator.

The method can also include identifying that the one or more communication resource units in an MU-PPDU are associated with an MU-MIMO transmission or an OFDMA single-user transmission based at least in part on the allocation plan indicator and the resource type indicator. The method can also include identifying a size of the one or more communication resource units, a number of users associated with an MU-MIMO transmission, or any combination thereof based at least in part on the allocation plan indicator and the resource type indicator.

Generating the resource allocation field can further include including an index with the allocation plan indicator, the index associated with a resource unit allocation plan for the one or more communication resource units. Generating the resource allocation field can also include including an index with the resource type indicator, the index associated with a number of users of the one or more communication resource units. Generating the common user field can include generating the resource allocation field to include a first resource allocation plan portion and a second user number portion. The at least one station-specific field can be associated with an OFDMA single-user transmission in an MU-PPDU and includes a station identification field, a modulation and coding scheme field, a coding field, a number of scheduled streams field, and space time block code field, and a transmit beamforming field. Additionally or alternatively, the at least one station-specific field is associated with an MU-MIMO transmission and comprises a station identification field, a modulation and coding scheme field, a coding field, a number of scheduled streams field, and a stream index.

The method can also include identifying that the one or more communication resource units in an MU-PPDU are for OFDMA single-user transmissions when the indicator of the first portion and the indicator of the second portion are both allocation plan indicators. Generating the resource allocation field can include including an index with both allocation plan indicators if a size of the one or more communication resource units is less than a predetermined threshold. Generating the resource allocation field can also include including an index with only one of the allocation plan indicators if a size of the one or more communication resource units is equal to or greater than a predetermined threshold.

The method can also include identifying that the one or more communication resource units are for multi-user multi-input multi-output (MU-MIMO) when at least one of the indicator of the first portion or the indicator of the second portion is the resource type indicator. Generating the resource allocation field includes including the resource type indicator with both the first portion and the second portion if a size of the one or more communication resource units is less than a predetermined threshold. Generating the resource allocation field can also include including the allocation plan indicator with one of the first portion and the second portion, and including the resource type indicator with another of the first portion and the second portion if a size of the one or more communication resource units is less than a predetermined threshold.

The method can also include generating a center station-specific field at a center position between a first station-specific field and a second station-specific field of the at least one station-specific field, where the center position of the center station-specific field identifies a center communication resource unit in the MU-PPDU. The method can also include generating a center station-specific field at a last position of the WLAN signaling field that follows the at least one station-specific field, where the last position of the center station-specific field identifies a center communication resource unit in the MU-PPDU.

A communications device includes a processor and memory communicatively coupled to the processor, the memory comprising computer-readable code that, when executed by the processor, causes the communications device to generate a common user field in a wireless local area network (WLAN) signaling field, the common user field decodable by a plurality of stations, the common user field comprising a resource allocation field indicating one or more communication resource units in a MU-PPDU and further indicating that the one or more communication resource units are associated with an MU-MIMO transmission or an OFDMA single-user transmission; generate, subsequent to the common user field in the WLAN signaling field, at least one station-specific field, wherein a position of the at least one station-specific field corresponds to one of the one or more communication resource units; and transmit a WLAN preamble that includes the WLAN signaling field.

A communications device includes means for generating a common user field in a wireless local area network (WLAN) signaling field, the common user field decodable by a plurality of stations, the common user field comprising a resource allocation field indicating one or more communication resource units in a MU-PPDU and further indicating that the one or more communication resource units are associated with an MU-MIMO transmission or an OFDMA single-user transmission; generating, subsequent to the common user field in the WLAN signaling field, at least one station-specific field, wherein a position of the at least one station-specific field corresponds to one of the one or more communication resource units; and transmitting a WLAN preamble that includes the WLAN signaling field.

A non-transitory computer-readable medium storing code for wireless communication at a wireless station is disclosed. The code includes instructions executable to cause a communication device to generate a common user field in a wireless local area network (WLAN) signaling field, the common user field decodable by a plurality of stations, the common user field comprising a resource allocation field indicating one or more communication resource units in a MU-PPDU and further indicating that the one or more communication resource units are associated with an MU-MIMO transmission or an OFDMA single-user transmission; generate, subsequent to the common user field in the WLAN signaling field, at least one station-specific field, wherein a position of the at least one station-specific field corresponds to one of the one or more communication resource units; and transmit a WLAN preamble that includes the WLAN signaling field.

Another method for wireless communication is described. The method includes receiving a WLAN preamble that comprises a common user field and at least one station-specific field; identifying a resource allocation field associated with the common user field indicating one or more communication resource units in a MU-PPDU and further indicating that the one or more communication resource units are associated with an MU-MIMO transmission or an OFDMA single-user transmission; and identifying a station-specific field of the at least one station-specific field associated with the station and at least one communication resource unit of the one or more communication resource units in a MU-PPDU corresponding to the station-specific field based at least in part on a position of the at least one station-specific field.

The method can also include identifying a size of the at least one communication resource unit based at least in part on the resource allocation field. The method can also include identifying that the at least one communication resource unit is associated with an MU-MIMO transmission or an OFDMA single-user transmission based at least in part on the resource allocation field. The method can also include identifying a number of users monitoring the at least one communication resource unit associated with an MU-MIMO transmission based at least in part on the resource allocation field. The method can also include identifying a location for the at least one communication resource units corresponding to the station-specific field based at least in part on the resource allocation field.

The method can also include identifying a center station-specific field at a center position between a first station-specific field and a second station specific field of the at least one station-specific field and identifying a center communication resource unit in the MU-PPDU corresponding to the center station specific field based at least in part on identifying the center station-specific field at the center position. The method can also include identifying a center station-specific field at a last position following the at least one station-specific field and identifying a center communication resource unit in the MU-PPDU corresponding to the center station-specific field based at least in part on identifying the center station-specific field at the last position.

A communications device includes a processor and memory communicatively coupled to the processor, the memory comprising computer-readable code that, when executed by the processor, causes the communications device to receive a WLAN preamble that comprises a common user field and at least one station-specific field; identify a resource allocation field associated with the common user field indicating one or more communication resource units in a MU-PPDU and further indicating that the one or more communication resource units are associated with an MU-MIMO transmission or an OFDMA single-user transmission; and identify a station-specific field of the at least one station-specific field associated with the station and at least one communication resource unit of the one or more communication resource units in a MU-PPDU corresponding to the station-specific field based at least in part on a position of the at least one station-specific field.

A communications device includes means for receiving a WLAN preamble that comprises a common user field and at least one station-specific field; identifying a resource allocation field associated with the common user field indicating one or more communication resource units in a MU-PPDU and further indicating that the one or more communication resource units are associated with an MU-MIMO transmission or an OFDMA single-user transmission; and identifying a station-specific field of the at least one station-specific field associated with the station and at least one communication resource unit of the one or more communication resource units in a MU-PPDU corresponding to the station-specific field based at least in part on a position of the at least one station-specific field.

A non-transitory computer-readable medium storing code for wireless communication at a wireless station is disclosed. The code includes instructions executable to cause a communication device to receive a WLAN preamble that comprises a common user field and at least one station-specific field; identify a resource allocation field associated with the common user field indicating one or more communication resource units in a MU-PPDU and further indicating that the one or more communication resource units are associated with an MU-MIMO transmission or an OFDMA single-user transmission; and identify a station-specific field of the at least one station-specific field associated with the station and at least one communication resource unit of the one or more communication resource units in a MU-PPDU corresponding to the station-specific field based at least in part on a position of the at least one station-specific field.

Some examples of the methods, apparatuses, or non-transitory computer-readable media described herein may further include processes, features, means, or instructions for resource allocation signaling in a high efficiency WLAN preamble. Further scope of the applicability of the described systems, methods, apparatuses, or computer-readable media will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4 illustrates an example of aspects of a WLAN protocol data unit for resource allocation signaling in a high efficiency WLAN preamble in accordance with various aspects of the present disclosure;

DETAILED DESCRIPTION

Figure 1:
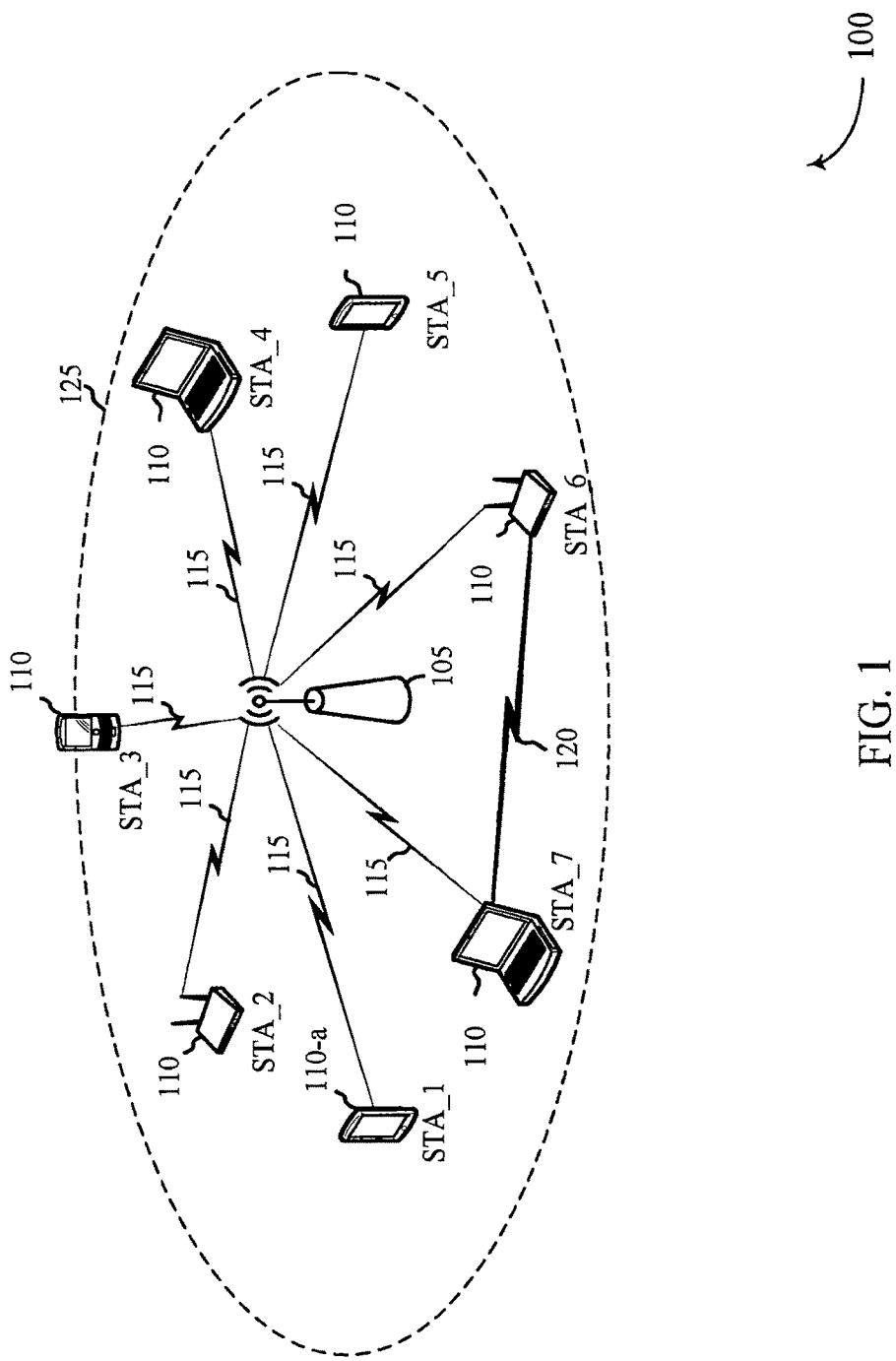
FIG. 1 illustrates an example of a wireless communications system that supports resource allocation signaling in a high efficiency wireless local area network (WLAN) preamble in accordance with various aspects of the present disclosure.

According to the present disclosure, a device may signal a resource allocation scheme in a high efficiency wireless local area network (WLAN) preamble. In one example, a high efficiency (HE) WLAN signaling field is used to signal a resource allocation pattern to multiple devices. The HE WLAN signaling field includes a common user field that is decodable by the multiple devices and includes a resource allocation field. The resource allocation field indicates resource unit distributions to the multiple devices and indicates which resource units in a MU-PPDU correspond to MU-MIMO transmissions and which resource units correspond to OFDMA single-user transmissions. The HE WLAN signaling field also includes dedicated user fields that are assigned to certain devices. The order of the dedicated user fields corresponds to the allocated resource units. The HE WLAN signaling field is transmitted with a WLAN preamble to the multiple devices.

In one example, a resource allocation field, located in the common field of the HE WLAN signaling field, includes indicators that specify a transmission type (e.g., OFDMA single-user, MU-MIMO, wideband, narrowband), a resource allocation pattern, and/or the number of users assigned to a resource unit allocation. The resource allocation field includes indices that complement the indicators to signal different resource allocation patterns, different resource allocation sizes, and/or the number of users associated with a resource allocation pattern. The resource allocation field is partitioned into a first and a second portion. In one example, the first portion is associated with and provides resource allocation information for the first portion of a channel and the second portion is associated with and provides resource allocation information for the second portion of the channel. In another example, only the first portion is used (e.g., to signal OFDMA single-user wideband transmissions). In yet another example, the first portion and the second portion are complementary and indicate the number of users associated with an MU-MIMO transmission.

In another example, the resource allocation field includes an allocation plan field and a first multi-user (MU) field and a second MU field. The allocation plan field is used to indicate the different resource allocation patterns that may be designated by the resource allocation field. The first MU field and the second MU field are used to designate the number of users associated with a resource allocation pattern for MU-MIMO transmissions. In one example, the first MU field corresponds to the first portion of a channel and the second MU field corresponds to the second portion of a channel (e.g., for MU resource unit allocations that are less than 20 MHz). In another example, the first and second MU fields are not used (e.g., in the case of an OFDMA single-user transmission). In yet another example, only the first MU portion is used to designate the number of users (e.g., for a wideband MU transmission).

The dedicated user blocks that are subsequent to the common field indicate to a device which resource allocation units are assigned to that device. In one example, the order by which the dedicated user blocks are generated after the common block corresponds to a resource unit. In this way, a device determines when a dedicated user block was received (e.g., the first user block) and identifies the corresponding allocated resource unit (e.g., the first resource unit) as being assigned to the device. The dedicated user block includes a station identification field to assign the dedicated user block to a device and additional control information associated with the upcoming transmission.

These and other aspects of the disclosure are further illustrated by and described with reference to apparatus diagrams, system diagrams, and flowcharts.

FIG. 1 illustrates an example of a wireless communications system 100 that supports resource allocation signaling in an HE wireless local area network (WLAN) preamble in accordance with various aspects of the present disclosure. For simplicity, the wireless communications system 100 is referred to as WLAN 100 in the following discussion.

The WLAN 100 includes an access point (AP) 105 and stations (STAs) 110 labeled as STA_1 through STA_7. The STAs 110 can be mobile handsets, tablet computers, personal digital assistants (PDAs), other handheld devices, netbooks, notebook computers, tablet computers, laptops, desktop computers, display devices (e.g., TVs, computer monitors, etc.), printers, etc. While only one AP 105 is illustrated, the WLAN 100 can have multiple APs 105. STAs 110, can also be referred to as a mobile stations (MS), mobile devices, access terminals (ATs), user equipment (UEs), subscriber stations (SSs), or subscriber units. The STAs 110 associate and communicate with the AP 105 via a communication link 115. Each AP 105 has a coverage area 125 such that STAs 110 within that area are within range of the AP 105. The STAs 110 are dispersed throughout the coverage area 125. Each STA 110 is stationary, mobile, or a combination thereof.

Although not shown in FIG. 1, a STA 110 can be covered by more than one AP 105 and can therefore associate with multiple APs 105 at different times. A single AP 105 and an associated set of STAs 110 is referred to as a basic service set (BSS). An extended service set (ESS) is a set of connected BSSs. A distribution system (DS) (not shown) is used to connect APs 105 in an extended service set. A coverage area 125 for an AP 105 can be divided into sectors making up only a portion of the coverage area (not shown). The WLAN 100 includes APs 105 of different types (e.g., metropolitan area, home network, etc.), with varying sizes of coverage areas and overlapping coverage areas for different technologies. Although not shown, other devices can communicate with the AP 105.

While the STAs 110 are capable of communicating with each other through the AP 105 using communication links 115, STAs 110 can also communicate directly with each other via direct wireless communication links 120. Direct wireless communication links can occur between STAs 110 regardless of whether any of the STAs is connected to an AP 105. Examples of direct wireless communication links 120 include Wi-Fi Direct connections, connections established by using a Wi-Fi Tunneled Direct Link Setup (TDLS) link, and other peer-to-peer (P2P) group connections.

The STAs 110 and APs 105 shown in FIG. 1 communicate according to the WLAN radio and baseband protocol including physical (PHY) and medium access control (MAC) layers from IEEE 802.11, and its various versions including, but not limited to, 802.11b, 802.11g, 802.11a, 802.11n, 802.11ac, 802.11ad, 802.11ah, 802.11z, etc.

Transmissions to/from STAs 110 and APs 105 oftentimes include control information within a header that is transmitted prior to data transmissions. The information provided in a header is used by a device to decode the subsequent data. High efficiency WLAN preambles can be used to schedule multiple devices, such as STAs 110, for single-user simultaneous transmission (e.g., single-user orthogonal frequency division multiple access (SU-OFDMA)) and/or MU-MIMO transmissions (e.g., multiple input multiple output MU-MIMO). In one example a HE WLAN signaling field is used to signal a resource allocation pattern to multiple receiving STAs 110. The HE WLAN signaling field includes a common user field that is decodable by multiple STAs 110, the common user field including a resource allocation field. The resource allocation field indicates resource unit distributions to the multiple STAs 110 and indicates which resource units in a resource unit distribution correspond to MU-MIMO transmissions and which resource units correspond to OFDMA single-user transmissions. The HE WLAN signaling field also includes, subsequent to the common user field, dedicated user fields that are assigned to certain STAs 110. The order in which the dedicated user fields are generated corresponds to the allocated resource units (e.g., the first dedicated user field corresponds to the first allocated resource unit). The HE WLAN signaling field is transmitted with a WLAN preamble to the multiple STAs 110.

Figure 2:
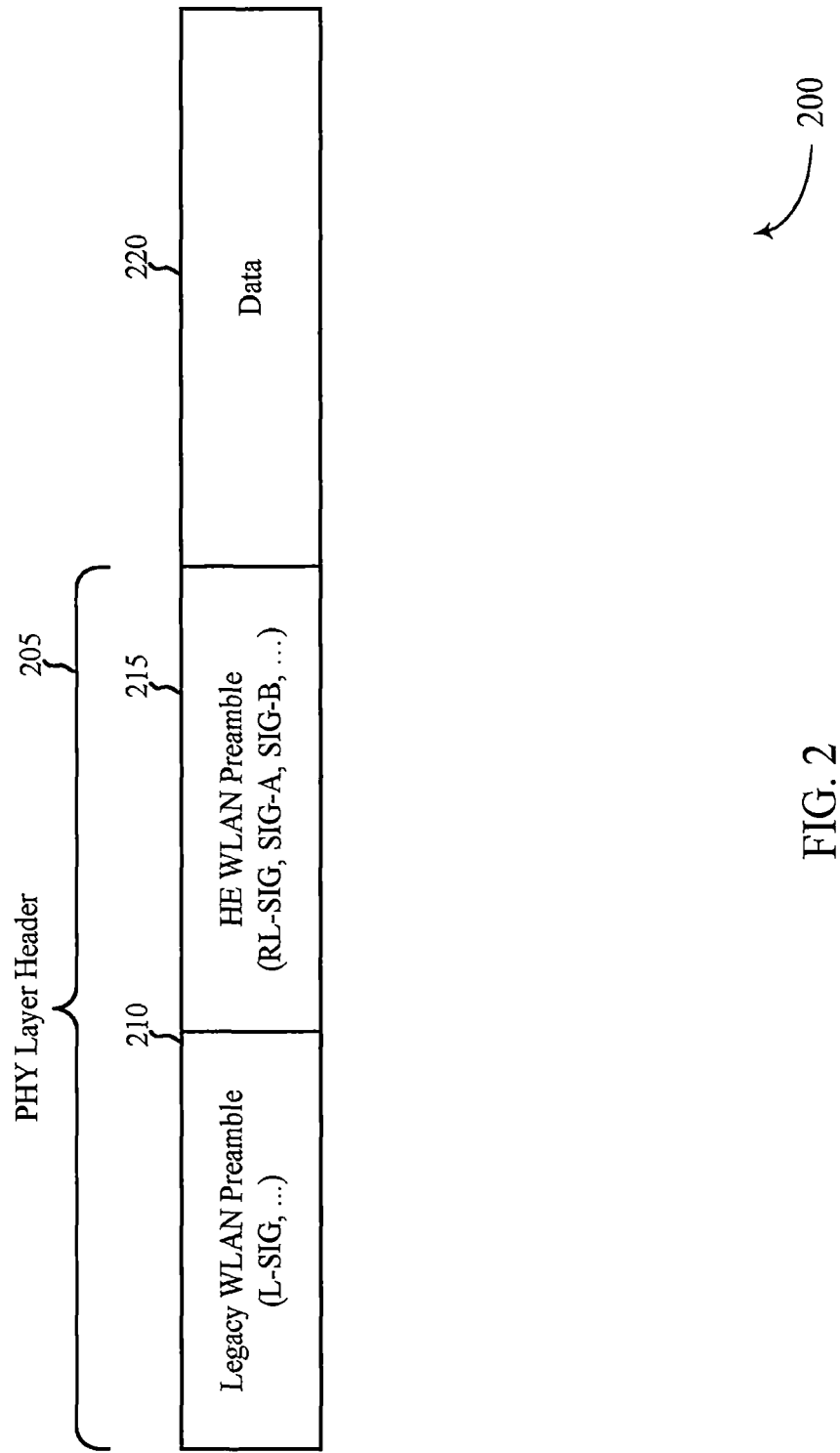
FIG. 2 shows an example of a WLAN protocol data unit (PDU) (e.g., a physical layer convergence PDU (PPDU)) resource allocation signaling in a high efficiency WLAN preamble in accordance with various aspects of the present disclosure.

FIG. 2 shows an example of a WLAN protocol data unit (PDU) 200 (e.g., a physical layer convergence PDU (PPDU)) resource allocation signaling in a high efficiency WLAN preamble in accordance with various aspects of the present disclosure. WLAN PDU 200 illustrates aspects of a transmission between a STA 110 and an AP 105, as described above with reference to FIG. 1.

In this example, the WLAN protocol data unit 200 includes a physical (PHY) layer header 205 and a data field 220 (e.g., a MAC protocol data unit (MPDU) or physical layer service data unit (PSDU)). The PHY layer header 205 includes a legacy WLAN preamble 210 and a high efficiency WLAN preamble 215. The preambles and data field are transmitted in the following order: legacy WLAN preamble 210, high efficiency WLAN preamble 215, data field 220.

The WLAN protocol data unit 200 is transmitted over a radio frequency spectrum band, which in some examples may include a plurality of sub-bands. In some examples, the radio frequency spectrum band may have a bandwidth of 80 MHz, and each of the sub-bands may have a bandwidth of 20 MHz. The legacy WLAN preamble 210 includes legacy short training field (STF) (L-STF) information, legacy long training field (LTF) (L-LTF) information, and legacy signaling (L-SIG) information. When the radio frequency spectrum band includes multiple sub-bands, the L-STF, L-LTF, and L-SIG information is duplicated and transmitted in each of the plurality of sub-bands. The legacy preamble is used for packet detection, automatic gain control, channel estimation, etc. The legacy preamble is also used to maintain compatibility with legacy devices.

The high efficiency WLAN preamble 215 includes any of: a repeated legacy WLAN field (e.g., an RL-SIG field), a first WLAN signaling field (e.g., a first high efficiency WLAN signaling field such as HE-SIG-A), a second WLAN signaling field (e.g., a second high efficiency WLAN signaling field such as HE-SIG-B), a WLAN STF (e.g., a high efficiency WLAN STF), and at least one WLAN LTF (e.g., at least one high efficiency WLAN LTF). The high efficiency WLAN preamble 215 enables an AP to simultaneously transmit to multiple stations (e.g., MU-MIMO) and also enables an AP to allocate resources to multiple stations for uplink/downlink transmissions (e.g., SU-OFDMA). The high efficiency WLAN preamble 215 uses a common signaling field and one or more dedicated (e.g., station-specific) signaling fields to schedule resources and to indicate the scheduling to other WLAN devices. A device uses the scheduling to determine which resource units associated with the frequency spectrum utilized by data field 220 have been allocated to the device for forthcoming communications.

Figure 3:
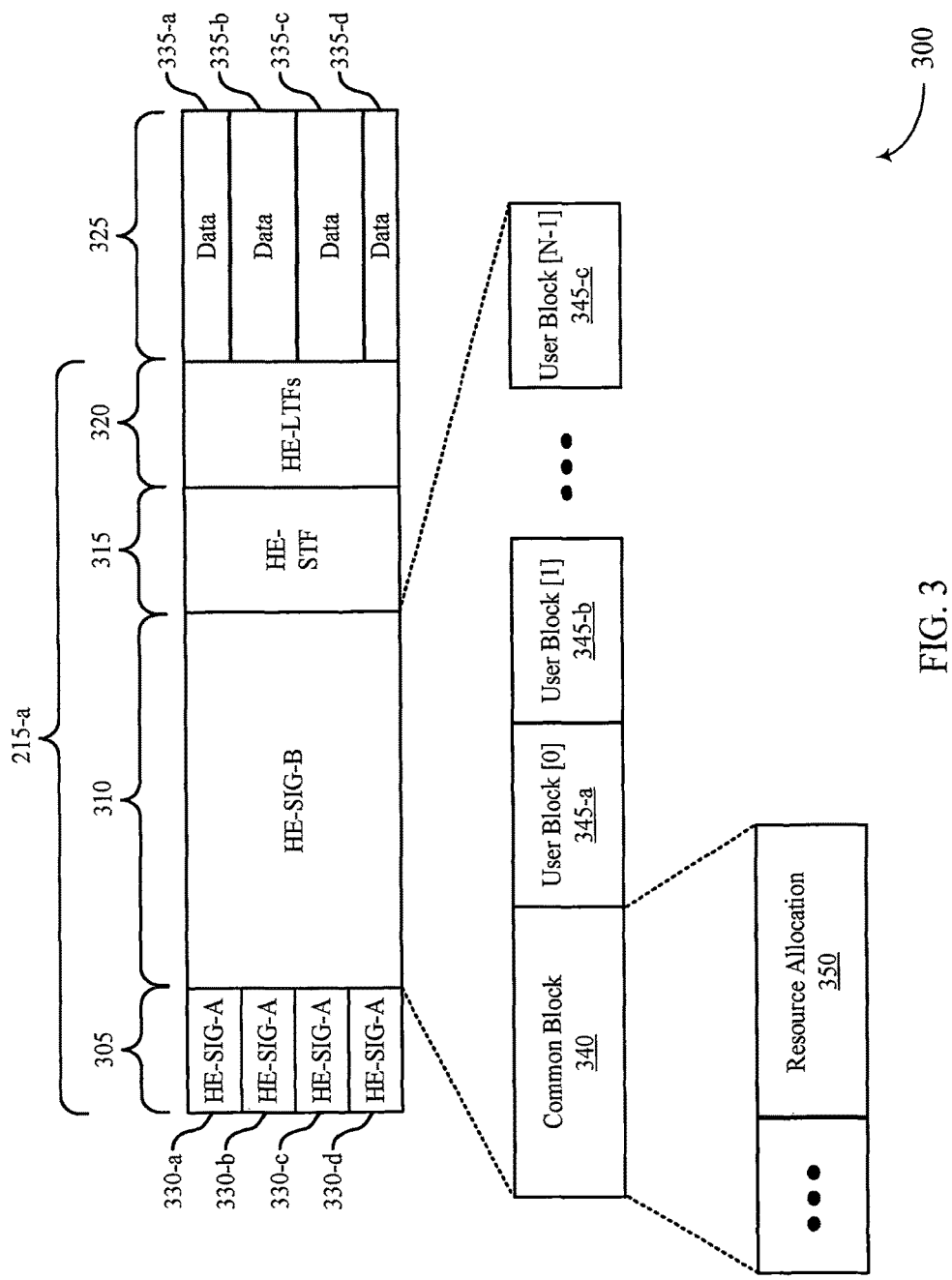
FIG. 3 illustrates an example of aspects of a WLAN protocol data unit for resource allocation signaling in a high efficiency WLAN preamble in accordance with various aspects of the present disclosure.

FIG. 3 illustrates an example of aspects of a WLAN protocol data unit 300 for resource allocation signaling in a high efficiency WLAN preamble in accordance with various aspects of the present disclosure. WLAN protocol data unit 300 illustrates aspects of a transmission between a STA 110 and an AP 105, as described above with reference to FIGS. 1-2. WLAN protocol data unit 300 includes a first WLAN signaling field 305, a second WLAN signaling field 310, a high efficiency STF 315, a high efficiency LTF 320, and a data field 325. The first WLAN signaling field 305 includes an HE-SIG-A 330 that is repeated across multiple sub-bands. The data field 325 includes data portions 335 that have been allocated to different devices. For instance, data portion 335-a is allocated to a first device, data portion 335-b to a second device, data portion 335-c to a first group of devices, and data portion 335-d to a second group of devices.

The first WLAN signaling field 305 includes high efficiency WLAN signaling information usable by APs and stations other than a number of APs or stations identified to receive or transmit communications in the WLAN protocol data unit 300. The first WLAN signaling field 305 also includes information usable by the identified number of APs or stations to decode the second WLAN signaling field 310. When the radio frequency spectrum band includes a plurality of sub-bands, the information (e.g., HE-SIG-A 330-a) included in the first WLAN signaling field 305 is duplicated and transmitted in each sub-band of the first WLAN signaling field 305, (e.g., HE-SIG-A 330-b to 330-d).

The second WLAN signaling field 310 includes high efficiency WLAN signaling information usable by a number of APs or stations identified to transmit or receive communications in the WLAN protocol data unit 300. More specifically, the second WLAN signaling field 310 includes information usable by the number of APs or stations to transmit/encode or receive/decode data in the data field 220. The second WLAN signaling field 310 can be encoded separately from the first WLAN signaling field 305. The second WLAN signaling field 310 includes a common block field 340 that signals information to a group of devices, such as high efficiency STAs within range of an AP, and user blocks 345-a to 345-c that signal information specific to specific high efficiency STAs. The common block includes a resource allocation field 350 that signals to the high efficiency device how the data field 325 is partitioned amongst devices (e.g., partitions the data field into resource units), which of the resource units are associated with SU-OFDMA and which are associated with MU-MIMO. Furthermore, the order of the user blocks 345 provides a link between the device associated with the user block 345 and the resource unit that has been allocated to the device. As an example, the resource allocation field 350 partitions the data field into nine regions (e.g., 20 MHz data region is partitioned into nine sub-regions that each span 26 tones). The STA addressed in the first user block corresponds to the first 26 tones, the second STA addressed in the second user block corresponds to the next 26 tones, etc. The common block may also include other fields, such as a LTF, FIG. 4 illustrates an example of aspects of a WLAN protocol data unit 400 for resource allocation signaling in a high efficiency WLAN preamble in accordance with various aspects of the present disclosure. WLAN protocol data unit 400 illustrates aspects of a transmission between a STA 110 and an AP 105, as described above with reference to FIGS. 1-2. WLAN protocol data unit 400 includes an HE-SIG-B field 310-a, which is an example of a second WLAN signaling field 310. HE-SIG-B FIELD 310-a includes four sub-bands that supports four streams 405-a to 405-d of control information. Streams 405-c and 405-d are redundant versions of streams 405-a and 405-b, which include the resource allocation and scheduling information for a number of devices. In one example, a device decodes both streams to acquire all of the content signaled in the HE-SIG-B FIELD 310-a. Furthermore, a device that receives a user block within a frequency band associated with a stream 405 also receives data within the same frequency band. The common and dedicated content (e.g. the information in common block fields 340-a and 340-b, and user blocks 345) for every other 20 MHz channel are signaled together.

FIGS. 5A-5F illustrate examples of resource allocation schemes 500 for resource allocation signaling in a high efficiency WLAN preamble in accordance with various aspects of the present disclosure. Resource allocation scheme 500 illustrates aspects of a transmission between a STA 110 and an AP 105, as described above with reference to FIGS. 1-4. Resource allocation scheme 500 includes HE-SIG-B FIELD 310-b and resource allocation field 350-a. Resource allocation field 350-a includes a first portion 515-a and a second portion 515-b. The first portion 515-a includes an indicator 505-a and indices 510-a, while the second portion 515-b includes an indicator 505-b and indices 510-b.

In one example, the resources allocated in the first portion 515-a correspond to a first portion of the bandwidth allocated to subsequent data transmissions (e.g., the first 10 MHz of a 20 MHz channel). The resources allocated in the second portion 515-b correspond to the second portion of the allocated bandwidth (e.g., the next 10 MHz of the 20 MHz channel). The indicators 505, with respect to one another and based at least in part on the information provided in indices 510, indicate to a set of enhanced devices that an upcoming transmission is SU-OFDMA or MU-MIMO, the resource allocation pattern (e.g., the size of the allocated resource units), and/or the number of users participating in an MU-MIMO transmission. The indicators 505 are one of an allocation plan indicator or a resource type indicator.

For example, if the first indicator 505-*a* is an allocation plan indicator (e.g., bit value 0) and the second indicator 505-*b* is an allocation plan indicator, then, for narrow band resource allocations (e.g., less than 20 MHz) the indices 510-*a* and 510-*b* signal how a 20 MHz band is partitioned for an SU-OFDMA. In some examples, the indicators are signaled with a bit and the indices are signaled using three bits to produce a resource allocation field 350-*a* that is constructed from eight bits. Additional examples of resource allocation schemes 500 are presented in the following discussion below.

Figure 5A:
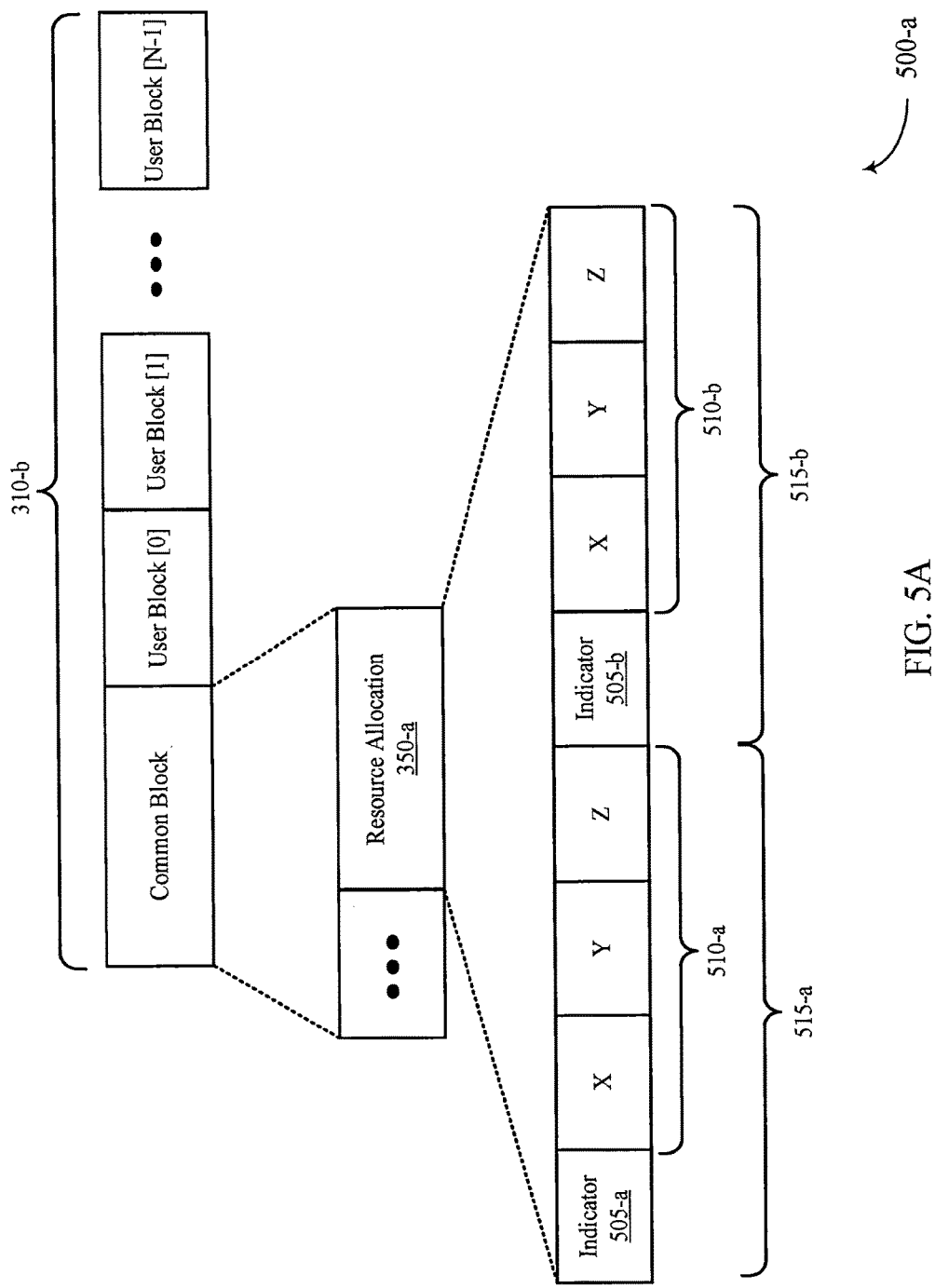
FIGS. 5A-5F illustrate examples of resource allocation schemes for resource allocation signaling in a high efficiency WLAN preamble in accordance with various aspects of the present disclosure.
Figure 5B:
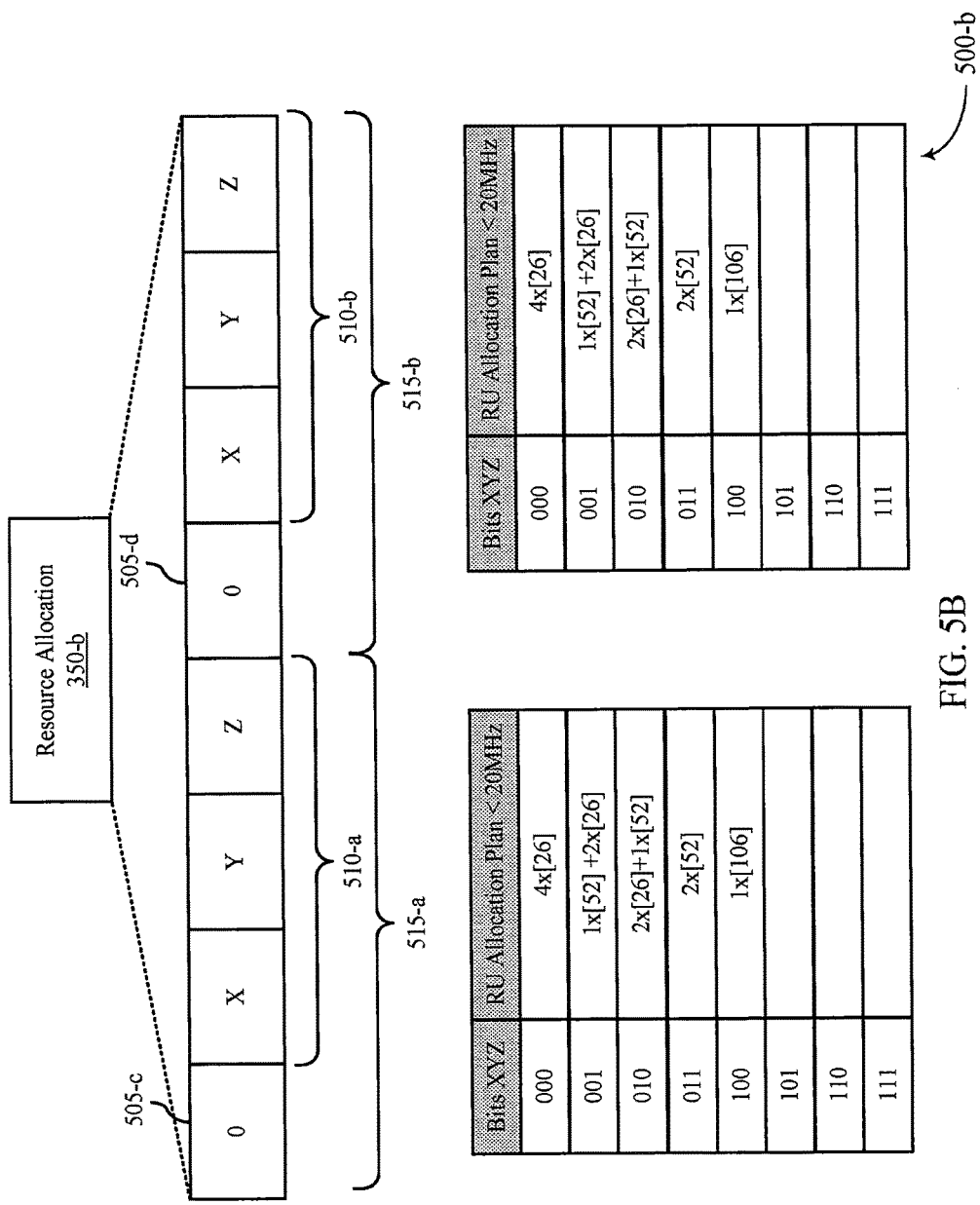

FIG. 5B illustrates an example of a resource allocation scheme 500-*b*. In this example, an SU-OFDMA resource allocation scheme for narrow band resource allocations (e.g., less than 20 MHz) is presented. The first indicator 505-*c* is signaled as an allocation plan indicator using bit value 0. Accordingly, the indices 510-*a* is used to signal the resource allocation pattern for a 20 MHz channel. For instance, if indices 510-*a* signals '000' a device that decodes the resource allocation field 350-*b* determines that the first 10 MHz of the 20 MHz is partitioned into four resource units that span 26 tones. Alternatively, if indices 510-*a* signals '100' the device determines that the full first 10 MHz is allocated to a single user. The second indicator 505-*d* also signals a bit value 0 and therefore signals an allocation plan indication. Similar to the above, based on indices 510-*b* a device that decodes resource allocation field 350-*b* determines how the second portion (e.g., the next 10 MHz portion of the 20 MHz channel is allocated).

Figure 5C:
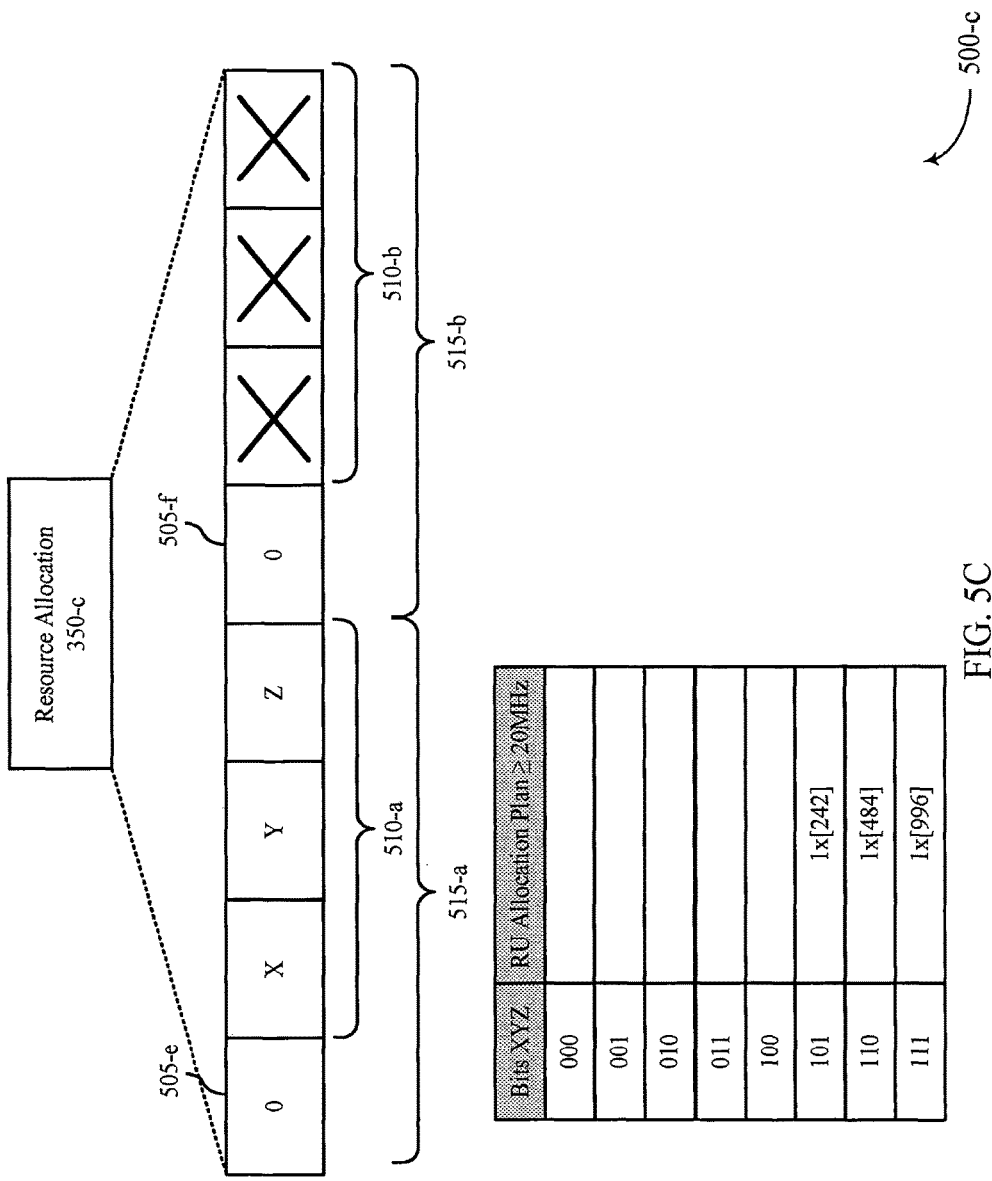

FIG. 5C illustrates an example of a resource allocation scheme 500-*c*. In this example, an OFDMA resource allocation scheme for wide band resource allocations (e.g., greater than or equal to 20 MHz) to single users is presented. The first indicator 505-*e* is signaled as an allocation plan indicator using bit value 0. Accordingly, the indices 510-*a* is used to signal the resource allocation pattern for a wide band channel (e.g., 20 MHz, 40 MHz, 80 MHz, etc.). For instance, if indices 510-*a* signals '101' a device that decodes the resource allocation field 350-*c* determines that the entire 20 MHz channel is allocated to a single resource unit. Alternatively, if indices 510-*a* signals '111' the device determines that the entire 80 MHz channel is allocated to a single resource unit. The second indicator 505-*f* also signals a bit value 0, which indicates to a device that the resource allocation is not associated with MU-MIMO transmissions. In this example, the device identifies that the resource allocation is greater than 20 MHz and that the first and second portions of the 20 MHz are allocated. Accordingly, the device ignores signaling in indices 510-*b*.

Figure 5D:
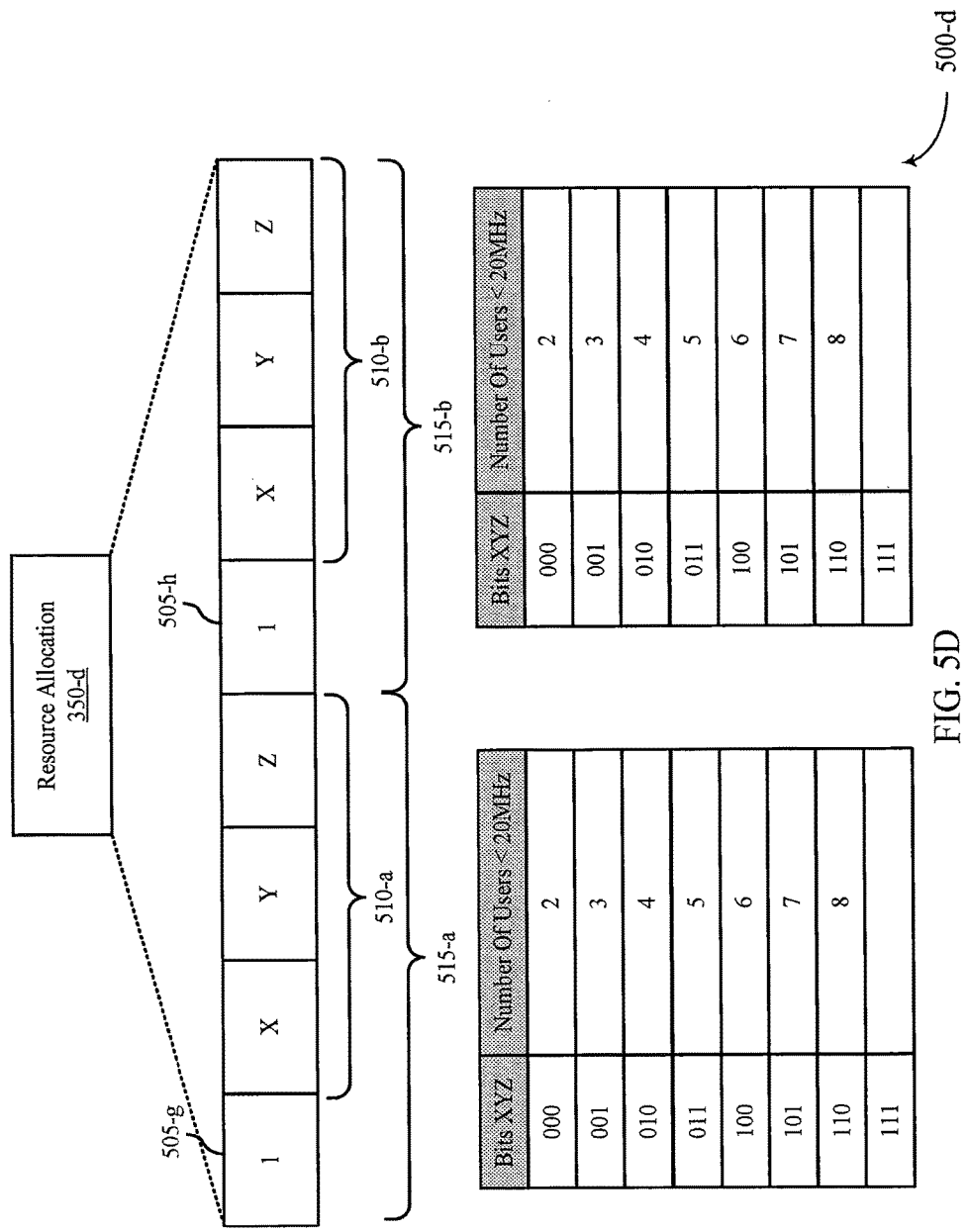

FIG. 5D illustrates an example of a resource allocation scheme 500-*d*. In this example, an MU-MIMO resource allocation scheme for narrow band resource allocations (e.g., less than 20 MHz) is presented. The first indicator 505-*g* is signaled as a resource type indicator using bit value 1. Accordingly, the indices 510-*a* is used to signal the number of users assigned to a resource unit (e.g., 2 to 8) for an MU-MIMO transmission. In this example, resource allocation less than 10 MHz (e.g., less than 106 tones) are not allocated for MU-MIMO transmissions. Accordingly, a device determines that since the resource assignment is less than 20 MHz (e.g., 242 tones) that the MU-MIMO assignment is 106 tones. Therefore, if indices 510-*a* signals '000' a device that decodes the resource allocation field 350-*b* determines that the first portion of the 20 MHz channel (e.g. the first 106 tones) have been assigned to two users. Alternatively, if indices 510-*a* signals '110' the device determines that the first portion of the channel has been assigned to eight users. In this example, the second indicator 505-*h* also signals a bit value 1. A device may similarly determine how many users have been scheduled for the second portion of the 20 MHz channel.

Figure 5E:
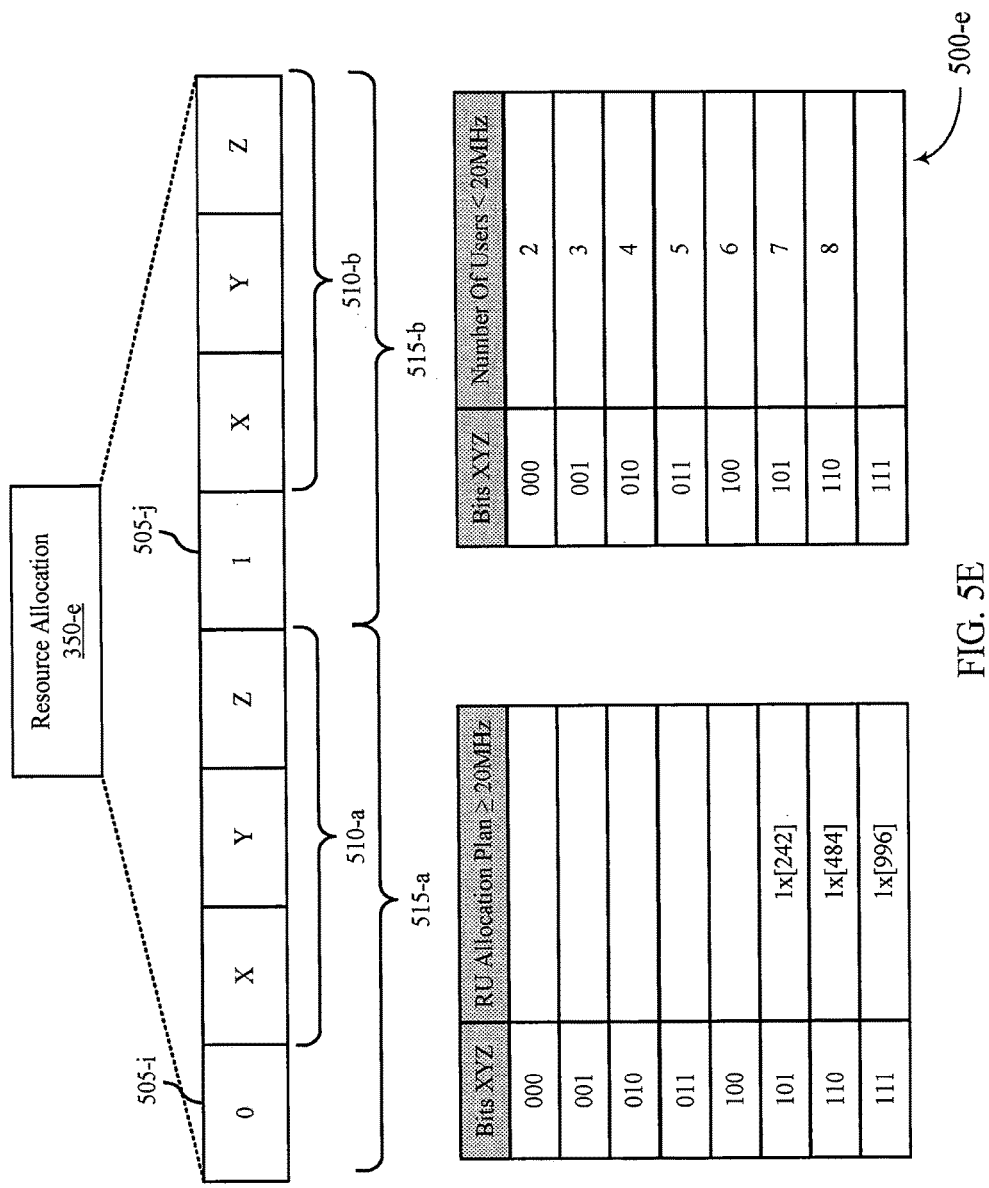

FIG. 5E illustrates an example of a resource allocation scheme 500-*e*. In this example, an MU-MIMO resource allocation scheme for wideband band resource allocations (e.g., greater than or equal to 20 MHz) is presented. In this example, a device determines that the MU-MIMO transmission will be greater than or equal to 20 MHz. A device determines that a wideband MU-MIMO transmission will occur and for how many users by parsing the first and second portion of the resource allocation field 350-*e*. The first indicator 505-*i* is signaled as a resource allocation plan indicator using bit value 0. Accordingly, the indices 510-*a* is used to signal the resource allocation pattern. Furthermore, the first indices 510-*a* signals that the resource unit allocation is for resource units greater than or equal to 20 MHz (e.g., by signaling '101', '110', or '111'). The device then determines that the wideband resource allocation is for MU-MIMO transmission by identifying the second indicator 505-*j* signals a resource type indicator using bit value 1. Therefore, the device decodes indices 510-*b* to determine the number of users that are associated with the resource unit allocated by the first portion 515-*a*.

Figure 5F:
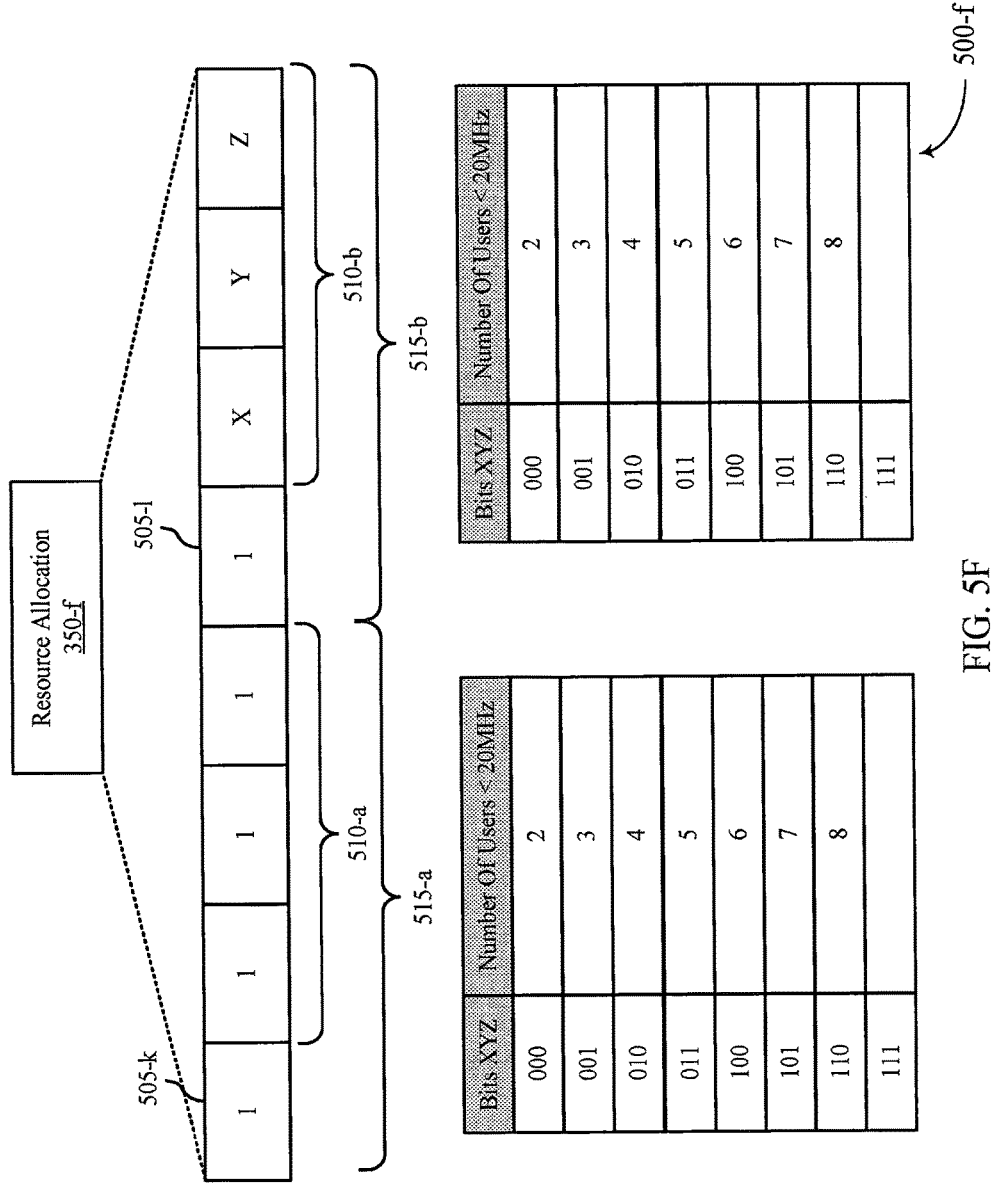

FIG. 5F illustrates an example of a resource allocation scheme 500-*f*. In this example, a resource allocation scheme for resource allocation of a 160 MHz band is presented. In this example, first indicator 505-*k* and indices 510-*a* signal '1111' to a device. The indices associated with '111' has been left free and therefore, for a resource type indicator, can be used to signal a 160 MHz band allocation. The 160 MHz can be signaled for either a SU-OFDMA transmission or an MU-MIMO transmission. For instance, to signal an MU-MIMO transmission the device signals a resource type indicator (e.g., '1') at indicator 505-*l*. Indices, 510-*b* is then used to specify the number of devices associated with the 160 MHz resource unit allocation. To signal a SU-OFDMA transmission the first portion also signals '1111'. However, the second portion signals a resource allocation type at indicator 505-*l* using a bit value 0. Accordingly, a device determines that the full 160 MHz bandwidth has been assigned to a single device.

Alternatively, a device signals an 80 MHz bandwidth allocation in two 20 MHz channels in a primary 40 MHz band. The device determines if the 160 MHz is allocated to SU-OFDMA by identifying that a single user block is transmitted subsequent to a common block. The device determines the 160 MHz is associated with an MU-MIMO transmission by identifying that each common block contains an 80 MHz distribution and the same number of users and by identifying that a single set of user content is transmitted in the dedicated portion. Additionally or alternatively, a device signals a 160 MHz bandwidth allocation in two 20 Mhz and also duplicating the single user block in the two 20 Mhz channels. The device determines the 160 MHz is associated with an MU-MIMO transmission by identifying that the same number of users is duplicated on the two 20 MHz portions.

Figure 6A:
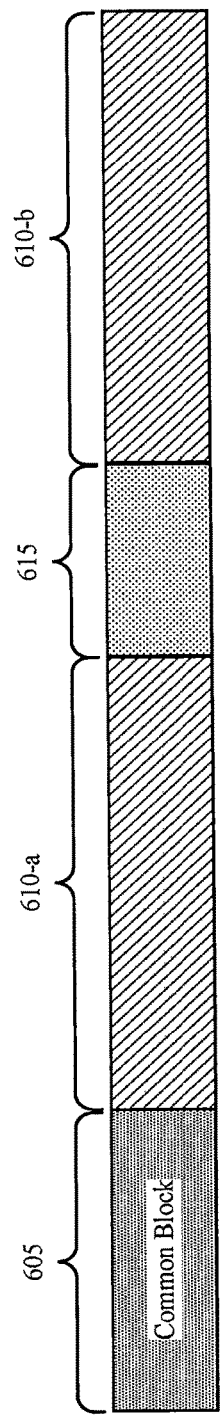
FIGS. 6A and 6B illustrate examples of common and dedicated block signaling for a high efficiency signaling B (HE-SIG-B) field that supports resource allocation signaling in a high efficiency WLAN preamble in accordance with aspects of the present invention.
Figure 6B:
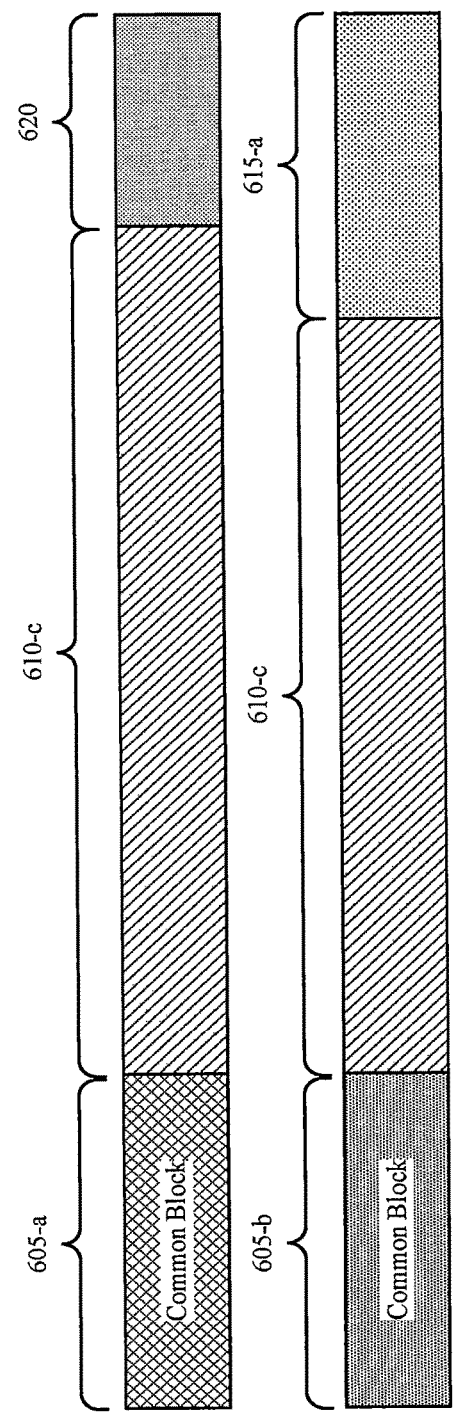

FIGS. 6A and 6B illustrate examples of common and dedicated block signaling for an HE-SIG-B field 600 that supports resource allocation signaling in a high efficiency WLAN preamble in accordance with aspects of the present invention. In this example, HE-SIG-B field 600 includes a common block 605, first dedicated content blocks 610-*a* associated with the first portion of a channel bandwidth, second dedicated content block 610-*b* associated with the second portion of the channel bandwidth, and a center dedicated content block 615 associated with a center tone resource unit.

FIG. 6A illustrates an example of the signaling in an HE-SIG-B field 600-*a* to indicate how the center 26 tones of a resource allocation are allocated to a certain user. A resource distribution such as provided in FIG. 5B allocates four 26 tone resource units to a first portion of a channel and four 26 tone resource unit to a second portion of a channel. This leaves 13 tones at the end of the first portion and the beginning of the second portion for a total of 26 central tones. This center 26 tone resource unit is implicitly signaled to a specific user via dedicated content block 615. The devices that receive HE-SIG-B field 600-*a* identify that the resource unit allocation in the first dedicated content blocks 610-*a* and the second dedicated content blocks 610-*b* are for resource unit sizes that are less than 20 MHz. Furthermore, the device identifies a central user block, such as a user block 345 described in FIGS. 3 and/or 4, in the center of the user block distribution scheme. The device associated with the central user block corresponding to the center dedicated content block 615 identifies that the center 26 tones are allocated to the associated device.

FIG. 6B illustrates an example of the signaling in an HE-SIG-B field 600-*b* to indicate how the center 26 tones of a resource allocation are allocated to a certain user for a wideband allocation. For instance when the resource unit allocation is 80 MHz an extra 26 tone RU is available between two 40 MHz resource units. The first common block 605-*a* is associated with the second and fourth 20 MHz resource units, while common block 605-*b* is associated with the first and third 20 MHz resource units. The dedicated content for the 26 center tones is provided at the end of the primary 20 MHz channel in center dedicated content block 615-*a*. The secondary 20 MHz channel includes a padding field 620 to compensate for the disparity in signaling between the secondary and primary 20 MHz channels.

Figure 7:
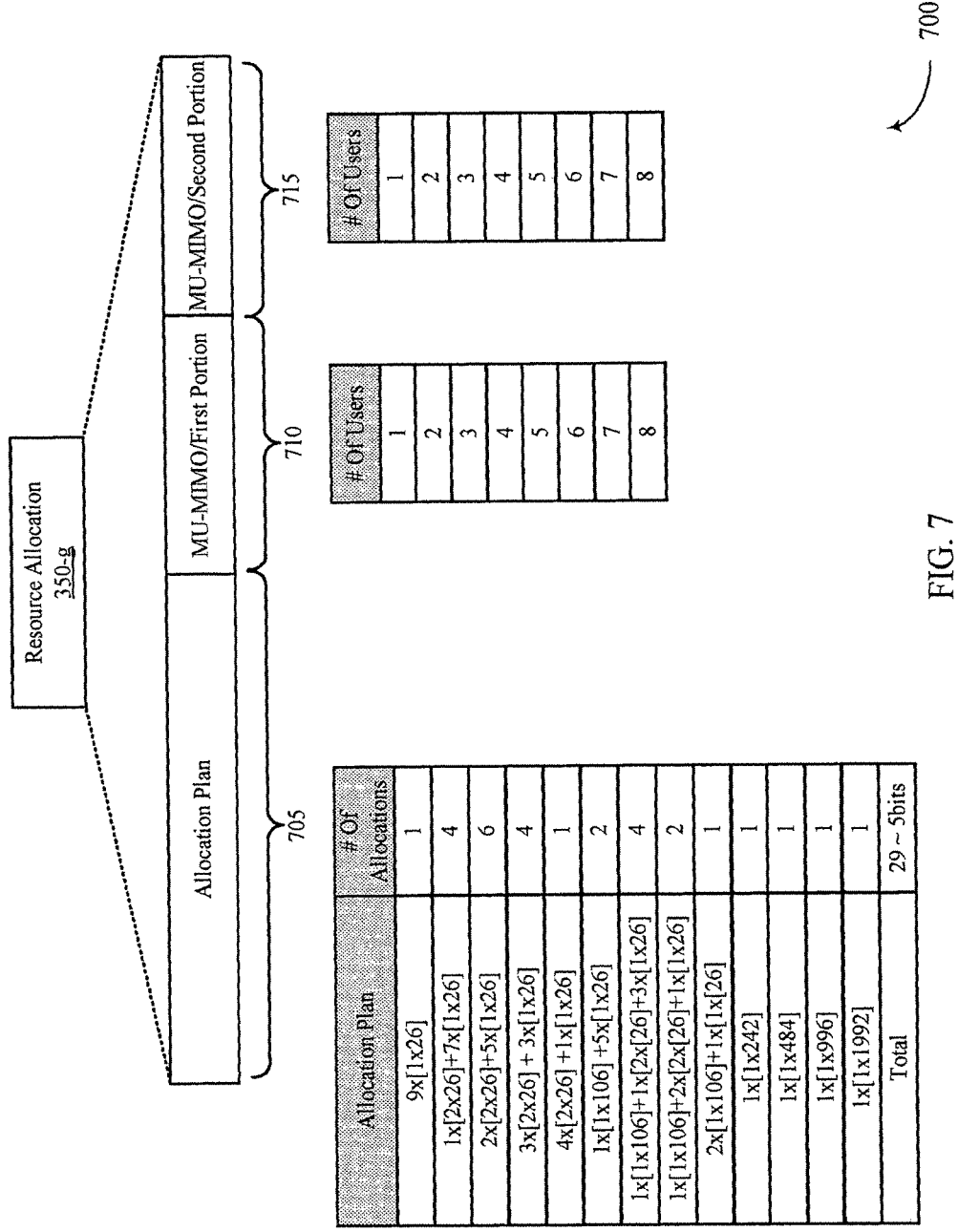
FIG. 7 illustrates an example of a resource allocation scheme that supports resource allocation signaling in a high efficiency WLAN preamble in accordance with aspects of the present invention.

FIG. 7 illustrates an example of a resource allocation scheme 700 that supports resource allocation signaling in a high efficiency WLAN preamble in accordance with aspects of the present invention. Resource allocation field 350-*g* includes an allocation plan field 705, a first MU-MIMO field 710 for the first portion of a channel, and a second MU-MIMO field 715 for the second portion of the channel. The allocation plan field 705 corresponds to each of the different allocations associated with an allocation plan. For instance, if nine 26 tone resource units are allocated then there is one allocation pattern to consider. For the allocation plan provided in this example, the different number of allocations total 29 and can be represented using 5 bits. The first MU-MIMO field 710 is used to indicate the number of MU-MIMO users associated with resource units in a first channel portion, while the second MU-MIMO field 715 is used to indicate the number of MU-MIMO users associated with a second channel portion. For instance, for a resource allocation that includes two 106 tone resource units, the number of users indicated in the first MU-MIMO field 710 corresponds to the first 106 tones, while the number of users in the second MU-MIMO field 715 corresponds to the second 106 tones. For examples where resource units greater than or equal to 20 MHz are allocated, the first MU-MIMO field 710 indicates the number of users associated with the wideband allocation and the second MU-MIMO field 715 is unused. For examples where less than 10 MHz allocations (e.g., 26 tones, 52 tones, etc.) are allocated, the first MU-MIMO field 710 and the second MU-MIMO field 715 are unused. For two 106 tone allocations, the first MU-MIMO field 710 and the second MU-MIMO field 715 may also be used to indicate that the first and second portions are associated with a SU-OFDMA transmissions, the first portion is SU-OFDMA and the second portion is MU-MIMO, and the like.

Figure 8A:
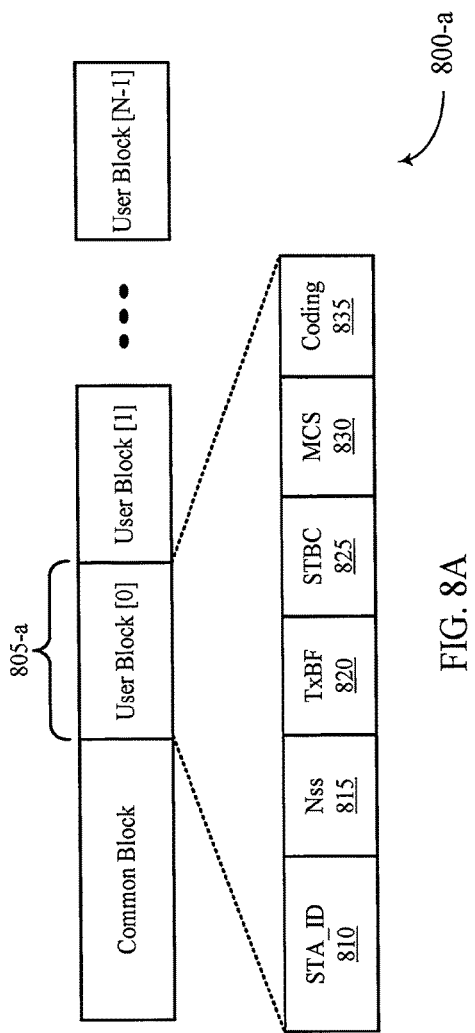
FIGS. 8A and 8B illustrate examples of an HE-SIG-B field that supports resource allocation signaling in a high efficiency WLAN preamble in accordance with aspects of the present invention.
Figure 8B:
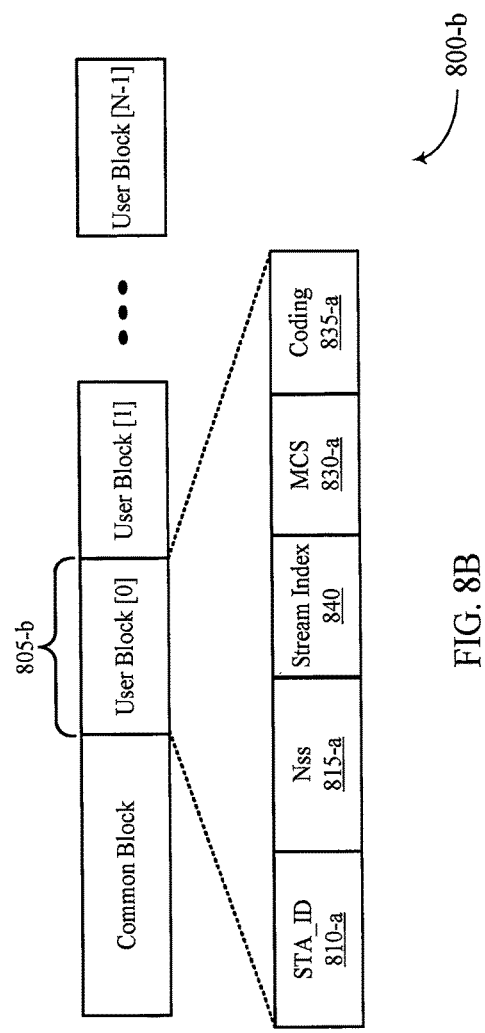

FIGS. 8A and 8B illustrate examples of HE-SIG-B field 800 that supports resource allocation signaling in a high efficiency WLAN preamble in accordance with aspects of the present invention. HE-SIG-B field 800 includes dedicated user block 805, which includes additional fields, such as a station identification (ID) field 810, a spatial stream indicator 815, a transmit beamforming field 820, a space time block coding (STBC) field, a modulation coding scheme (MCS) field, a coding field 835, and a stream index 840.

FIG. 8A illustrates a dedicated user block 805-*a* that is associated with SU-OFDMA transmissions. The station ID field 810 is used to identify an intended recipient for the user block, the spatial stream indicator 815 indicates the number of scheduled streams scheduled for a device, transmit beamforming field 820 which indicates whether transmit beamforming is utilized for transmission to the device, STBC field 825 which indicates the space time block code used for a transmission to the device, the MCS field 830, which indicates the modulation and coding scheme used for the corresponding data transmission, and the coding field 835. As explained above, the order that the dedicated user blocks 805 are transmitted corresponds to the resource unit allocation. That is, each resource unit is associated with a position of each user block.

FIG. 8B illustrates a dedicated user block 805-*b* that is associated with MU-MIMO transmissions. The dedicated user block 805-*b* includes a station ID field 810-*a*, spatial stream indicator 815, stream index 840, which indicates the index of the first stream and additional streams assigned to the device designated in the station ID field 810-*a*, MCS field 830-*a*, and coding field 835-*a*. Group IDs can be indicated in the common block for MU-MIMO allocations.

Figure 9A:
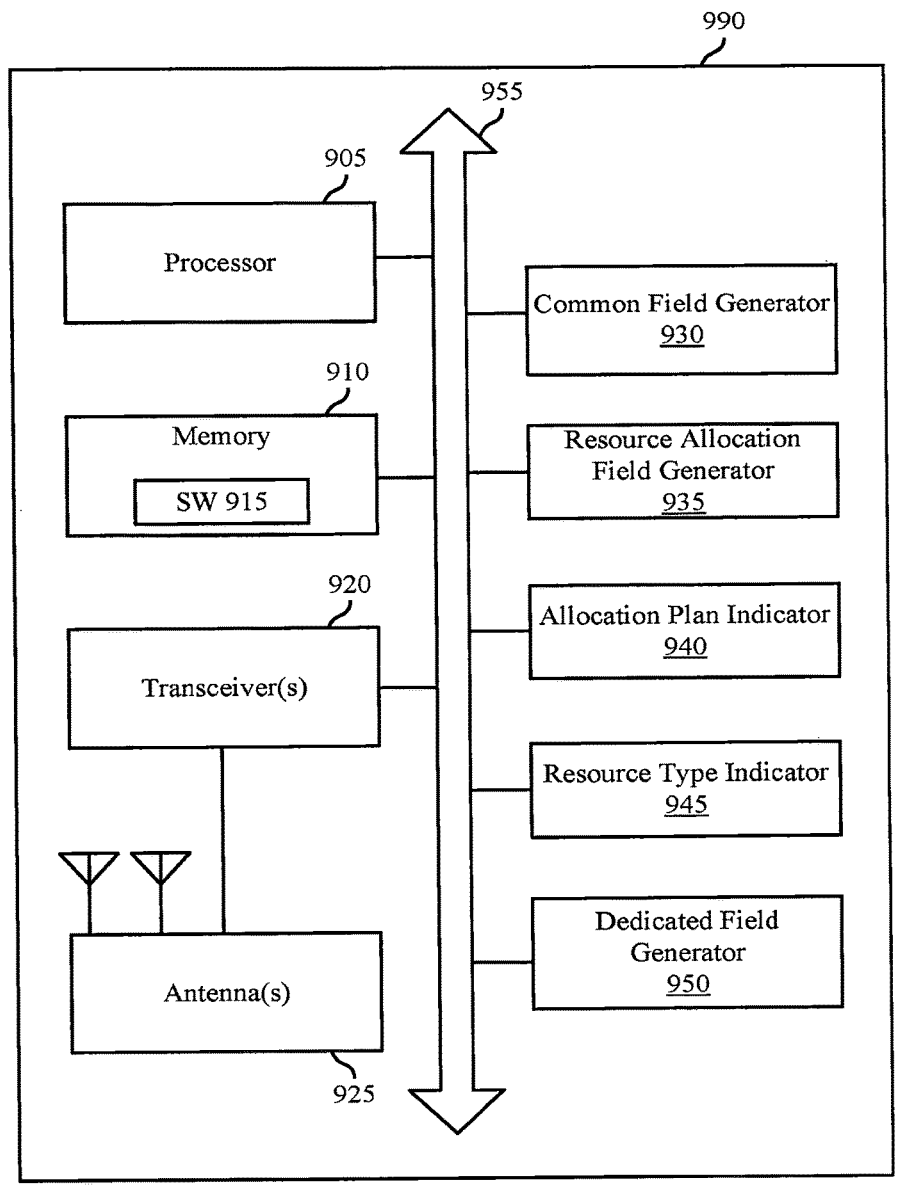
FIGS. 9A and 9B show block diagrams of an example station (STA) that supports time-controlled spatial interference rejection in accordance with various aspects of the present disclosure.

FIG. 9A shows a block diagram 900-*a* of an example wireless device 990 that supports resource allocation signaling in a HE WLAN preamble in accordance with various aspects of the present disclosure, and with respect to FIGS. 1-8B. The wireless device 990, which may be an example of a STA 110 or an AP 105, includes a common field generator 930, a resource allocation field generator 935, an allocation plan indicator 940, a resource type indicator 945, and a dedicated field generator 950. The processor 905, memory 910, transceiver(s) 920, the common field generator 930, resource allocation field generator 935, allocation plan indicator 940, resource type indicator 945, and dedicated field generator 950 are communicatively coupled with a bus 955, which enables communication between these components. The antenna(s) 925 are communicatively coupled with the transceiver(s) 920.

The processor 905 is an intelligent hardware device, such as a central processing unit (CPU), a microcontroller, an application-specific integrated circuit (ASIC), etc. The processor 905 processes information received through the transceiver(s) 920 and information to be sent to the transceiver(s) 920 for transmission through the antenna(s) 925.

The memory 910 stores computer-readable, computer-executable software (SW) code 915 containing instructions that, when executed, cause the processor 905 or another one of the components of the wireless device 990 to perform various functions described herein, for example, triggering a roaming scan and determining whether to roam to a different channel.

The transceiver(s) 920 communicate bi-directionally with other wireless devices, such as APs 105, base station 150, STAs 110, or other devices. The transceiver(s) 920 include a modem to modulate packets and frames and provide the modulated packets to the antenna(s) 925 for transmission. The modem is additionally used to demodulate packets received from the antenna(s) 925.

The common field generator 930, resource allocation field generator 935, allocation plan indicator 940, resource type indicator 945, and dedicated field generator 950 implement the features described with reference to FIGS. 1-8B, as further explained below.

Again, FIG. 9A shows only one possible implementation of a device executing the features of FIGS. 1-8B. While the components of FIG. 9A are shown as discrete hardware blocks (e.g., ASICs, field programmable gate arrays (FPGAs), semi-custom integrated circuits, etc.) for purposes of clarity, it will be understood that each of the components may also be implemented by multiple hardware blocks adapted to execute some or all of the applicable features in hardware. Alternatively, features of two or more of the components of FIG. 9A may be implemented by a single, consolidated hardware block. For example, a single transceiver 920 chip may implement the processor 905, memory 910, common field generator 930, resource allocation field generator 935, allocation plan indicator 940, resource type indicator 945, and dedicated field generator 950.

Figure 9B:
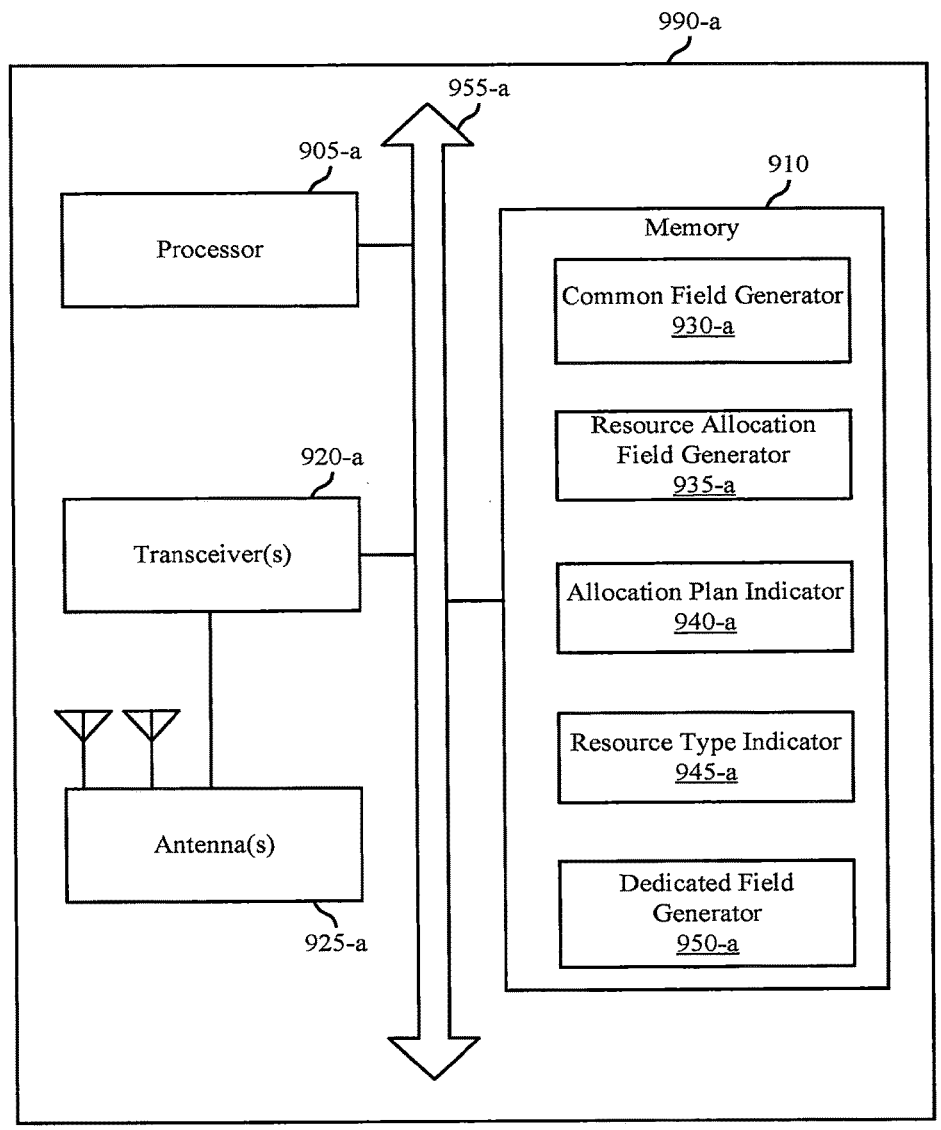

In still other examples, the features of each component may also be implemented, in whole or in part, with instructions embodied in a memory, formatted to be executed by one or more general or application-specific processors. For example, FIG. 9B shows a block diagram 900-b of another example of a wireless device 990-a in which the features of the common field generator 930-a, resource allocation field generator 935-a, allocation plan indicator 940-a, resource type indicator 945-a, and dedicated field generator 950-a are implemented as computer-readable code stored on memory 910-a and executed by one or more processors 905-a. Other combinations of hardware/software may be used to perform the features of one or more of the components of FIGS. 9A-9B.

Figure 10:
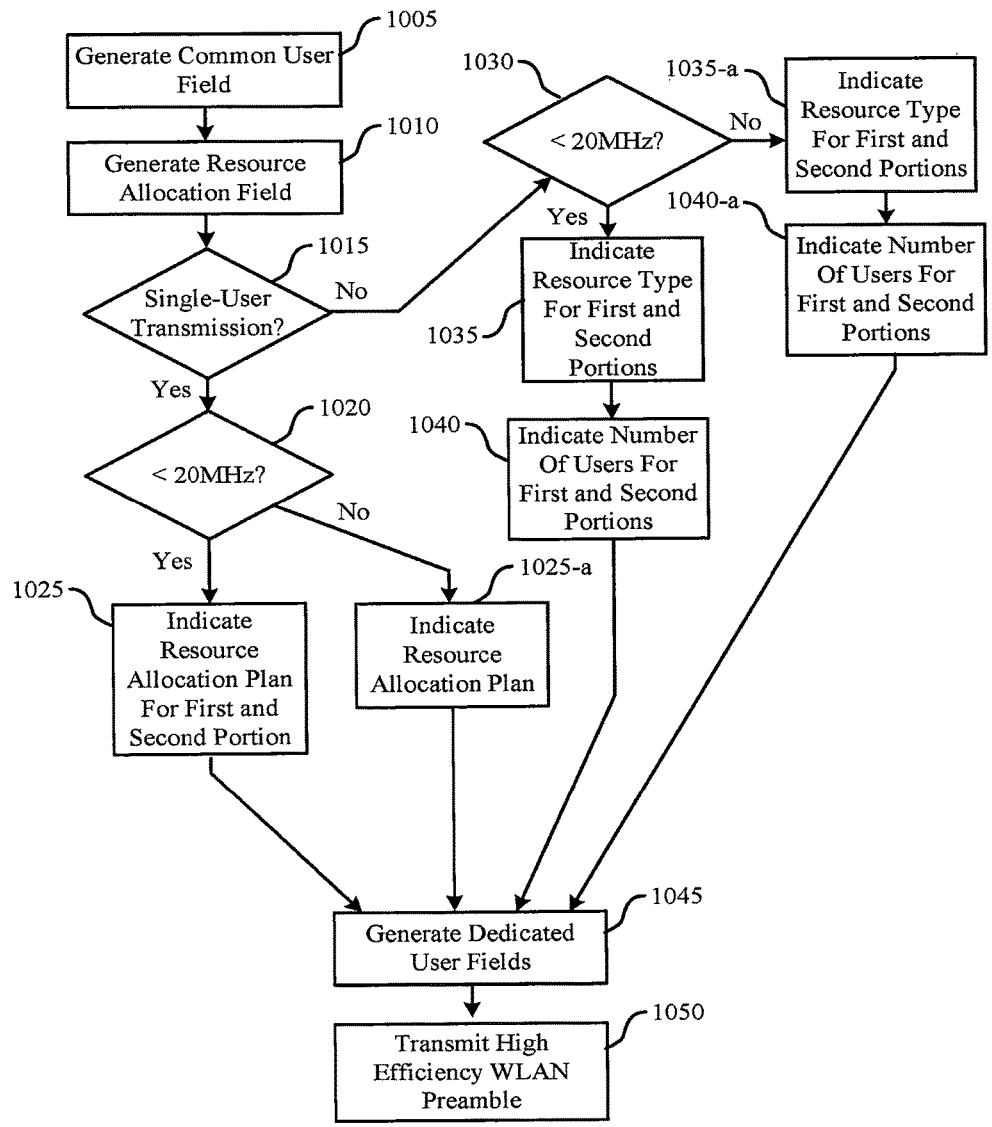
FIGS. 10 and 11 show flow charts that illustrate examples of methods for wireless communication, in accordance with various aspects of the present disclosure.

FIG. 10 shows a flow chart that illustrates one example of a method 1000 for wireless communication, in accordance with various aspects of the present disclosure. The method 1000 can be performed by any of the wireless devices 990, APs 105, or STAs 110 discussed in the present disclosure, but for clarity the method 1000 will be described from the perspective of wireless device 990 and wireless device 990-a, of FIGS. 9A and 9B.

Broadly speaking, the method 1000 illustrates a procedure by which a device, such as a STA 110 or an AP 105, generates a WLAN signaling field that includes a common user field that is decodable by multiple stations and that comprises a resource allocation field that indicates one or more communication resource units in a MU-PPDU and further indicates that a communication resource unit is associated with a MU-MIMO or an OFDMA single-user transmissions. The device also generates in the WLAN signaling field, subsequent to the common field, station specific fields, where the position of the station specific fields corresponds to the resource units allocated by the resource allocation field and transmits a WLAN preamble including the WLAN signaling field.

At 1005, the common field generator 930 is used to generate a common user field in a WLAN signaling field. The common user field is decodable by multiple stations and includes a resource allocation field that partitions a set of frequency resources between multiple devices.

At 1010, the resource allocation field generator 935 generates the resource allocation field. The resource allocation field indicates a resource unit allocation pattern (e.g., a breakdown of the set of frequency resources into one or more resource units) and also indicates that a resource unit in an MU-PPDU is associated with an MU-MIMO transmission or an OFDMA single-user transmission.

At 1015, the resource allocation field generator 935 determines if a resource unit allocation for a MU-PPDU is associated with an OFDMA single-user transmission (e.g., if the resource unit allocation pattern is intended for single device communication).

At 1020, after determining a resource unit allocation is associated with an OFDMA single-user transmission, the resource allocation field generator 935 determines if the resource unit allocation allocates resource units that are less than 20 MHz in frequency. The allocation plan indicator 940 is used to indicate to a device that a following indices are associated with a resource distribution. And the following indices is used to designate a resource pattern and the size of the resource units.

At 1025, after determining the frequency associated with the resource unit allocation is below 20 MHz and that the resource unit is associated with an OFDMA single-user transmission, the resource allocation field generator 935 determines an allocation plan for the first and second portion of a 20 MHz band. The allocation plan indicator 940 is used to indicate to a device that a following index is associated with a resource distribution. The following index designates resource unit patterns that include resource units that span up to 52 tones. The resource allocation field generator 935 further partitions a 20 MHz bandwidth into first and second 10 MHz portions. A first and second allocation plan indicator 940 and corresponding resource allocation indices are provided for both the first and second portion.

At 1025-a, after determining that the frequency associated with the resource unit allocation is greater than or equal to 20 MHz based on the indices and that the resource unit is associated with an OFDMA single-user transmission, the resource allocation field generator 935 determines an allocation plan for the full resource unit. The allocation plan indicator 940 is used to indicate to a device that a following index is associated with a resource distribution. The following index designates single resource units that include 242 to 996 tones in frequency (e.g., 20 MHz to 80 MHz).

At 1030, after determining that a transmission is not an OFDMA single-user transmission (i.e., is an MU-MIMO transmission), the resource allocation field generator 935 determines if the resource allocation is less than 20 MHz. The resource type indicator 945 is used to indicate to a device that the following indices are associated with the number of users assigned to receive information over a resource unit.

At 1035, after determining a transmission is associated with an MU-MIMO transmission and identifying the resource unit allocation is less than 20 MHz, the resource allocation field generator 935 indicates that the transmission is an MU-MIMO transmission by including the resource type indicator 945 in the resource allocation field. The resource unit associated with the resource type indicator 945 may implicitly be determined to be 106 tones based on identifying that the resource units are less than 20 MHz and by determining that MU-MIMO allocations less than 106 tones are not supported. The resource allocation field generator 935 partitions the 20 MHz bandwidth into first and second 10 MHz portions. A first and second resource type indicator 945 is associated with both the first and second portions along with the following indices to designate the number of users for a first MU transmission over the first portion and the number of users for a second MU transmission over the second portion. For resource unit allocations smaller than 20 MHz, the resource type indicator 945 can also be combined with the allocation plan indicator to indicate that a first portion is associated with an OFDMA single-user transmission and a second portion is associated with an MU-MIMO transmission and vice versa.

At 1040, the indices included in the resource allocation field and following the resource type indicator are used to indicate the number of users that are associated with the allocated resource units in both the first and second portions.

At 1035-a, after determining a transmission is associated with an MU-MIMO transmission and identifying the resource unit allocation is greater than or equal to 20 MHz, the resource allocation field generator 935 indicates that the transmission is a wideband MU-MIMO transmission by including the allocation plan indicator 940 in the resource allocation field and by indicating with the following indices that the resource unit distribution is greater than 20 MHz. Furthermore, to distinguish the wideband MU-MIMO transmission form the wideband OFDMA single-user transmission, a resource type indicator 945 is included in the second portion of the resource allocation field.

At 1040-a, the indices following the resource type indicator 945 is used to indicate the number of users participating in the wideband MU-MIMO transmission.

At 1045, dedicated field generator 950 generates the dedicated user fields subsequent to the common field. The dedicated field generator 950 generates the dedicated user fields in an order that corresponds to the resource unit allocation pattern. For example, the first portion of a 20 MHz band may be allocated to four 26 tone resource units and the second portion of the 20 MHz band may also be allocated to four 26 tone resource units. Accordingly, the first dedicated user block may correspond to the first 26 tone resource unit and by extension the device assigned to the first dedicated user block is allocated the first 26 tone resource unit. For resource unit allocations of less than 20 MHz, there are 26 tones in the center of the 20 MHz bandwidth that are not assigned by the resource allocation pattern (e.g., 13 unassigned tones in the first portion and 13 unassigned tones in the second portion). Accordingly, the dedicated field generator 950 inserts between the dedicated user blocks corresponding to the first portion and the dedicated user block corresponding to the second portion a dedicated user block corresponding to the center tones. Similarly, for resource unit allocations of 80 MHz or 160 MHz, the center 26 tones are unassigned. In this example, the dedicated field generator 950 generates a dedicated user block corresponding to the center tones at the end of the primary 20 MHz channel including the common and dedicated portions.

At 1050, the WLAN signaling field is included in the high efficiency WLAN preamble and a WLAN preamble, which includes the high efficiency WLAN preamble, is transmitted over the WLAN channel.

Figure 11:
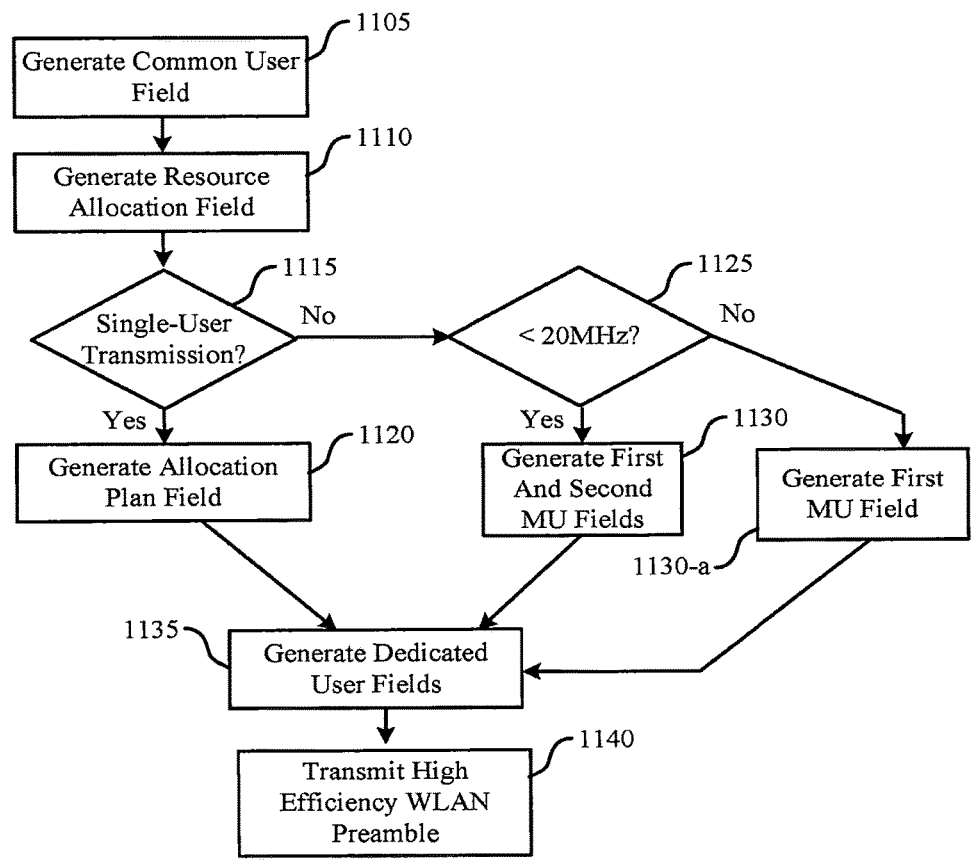

FIG. 11 shows a flow chart that illustrates one example of a method 1100 for wireless communication, in accordance with various aspects of the present disclosure. The method 1000 can be performed by one of the wireless devices 990, APs 105, or STAs 110 discussed in the present disclosure, but for clarity the method 1000 will be described from the perspective of wireless device 990 and wireless device 990-a, of FIGS. 9A and 9B.

Broadly speaking, the method 1100 illustrates another procedure by which a device, such as a STA 110 or an AP 105, generates a WLAN signaling field that includes a common user field that is decodable by multiple stations and that comprises a resource allocation field that indicates one or more communication resource units in a MU-PPDU and further indicates that a communication resource unit is associated with a multi-user or an OFDMA single-user transmissions. The device also generates in the WLAN signaling field, subsequent to the common field, station specific fields, where the position of the station specific fields corresponds to the resource units allocated by the resource allocation field and transmits a WLAN preamble including the WLAN signaling field.

At 1105, the common field generator 930 is used to generate a common user field in a WLAN signaling field. The common user field is decodable by multiple stations and includes a resource allocation field that partitions a set of frequency resources between multiple devices.

At 1110, the resource allocation field generator 935 generates the resource allocation field. The resource allocation field indicates a resource unit allocation pattern (e.g., a breakdown of the set of frequency resources into one or more resource units) and also indicates that a resource unit in an MU-PPDU is associated with an MU-MIMO transmission or an OFDMA single-user transmission. The resource allocation field includes an allocation plan field, and multi-user fields that correspond to a first and second portion of a channel, as generally described in FIG. 7.

At 1115, the resource allocation field generator 935 determines if a resource unit allocation in a MU-PPDU is associated with an OFDMA single-user transmission (e.g., if the resource unit allocation pattern is intended for single device communication).

At 1120, the resource allocation field generator 935 generates the allocation plan field. The allocation plan field indicates the resource allocation pattern from a number of available resource allocation patterns (e.g., using a 5 bit look up table) via an allocation plan indicator 940. For OFDMA single-user transmission only the allocation plan field is utilized. The allocation plan field can indicate both narrow band (e.g., less than 20 MHz) and wide band (e.g., greater than or equal to 20 MHz) transmissions to a device.

At 1125, after identifying the transmission is an MU-MIMO transmission the resource allocation field generator 935 determines whether the resource unit allocation includes resource units less than 20 MHz.

At 1130, after identifying that the resource unit allocation is less than 20 MHz the resource type indicator 945 identifies that a resource unit is associated with an MU-MIMO transmission. The resource type indicator 945 indicates the number of users assigned to the resource unit associated with the first portion of the 20 MHz in a first MU field and the number of users assigned to the second portion of the 20 MHz in a second MU field. As mentioned above, for resource unit allocation less than 106 tones the resource allocation field generator will not support MU-MIMO transmissions. Accordingly, MU fields included in the resource type indicator are unused for MU-MIMO transmissions less than 106 tones in frequency.

At 1130-a, after identifying that the resource unit allocation is greater than or equal to 20 MHz and identifying that the resource unit is associated with an MU-MIMO transmission, the resource type indicator 945 uses the first MU field to indicate the number of users associated with the wideband MU-MIMO transmission.

At 1135, dedicated field generator 950 generates the dedicated user fields subsequent to the common field. The dedicated field generator 950 generates the dedicated user fields in an order that corresponds to the resource unit allocation pattern. For example, the allocation plan indicator 940 indicates the resource allocation pattern (e.g., nine 26 tone resource units) that includes the center resource unit implicitly signaled in method 1000. Each dedicated user field then corresponds to the nine resource units (e.g., the first user field corresponds to the first allocated resource unit, the second user field to the second allocated resource unit, and so on.)

At 1140, the WLAN signaling field is included in the high efficiency WLAN preamble and a WLAN preamble, which includes the high efficiency WLAN preamble, is transmitted over the WLAN channel. Aspects of method 1000 and 1100 may be combined and/or performed in different orders than those described above.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of communication at an access point, comprising:
    generating a common user field in a wireless local area network (WLAN) signaling field, the common user field decodable by a plurality of stations, and the common user field comprising a resource allocation field indicating one or more communication resource units of a data field in a multi-user (MU) physical layer protocol data unit (PPDU) (MU-PPDU) and further indicating that the one or more communication resource units are associated with an MU multi-input multi-output (MIMO) transmission or an orthogonal frequency division multiple access (OFDMA) single-user transmission;

generating, subsequent to the common user field in the WLAN signaling field, at least one station-specific field in the WLAN signaling field, wherein a position of the at least one station-specific field within the WLAN signaling field identifies a position of one of the one or more communication resource units of a resource unit allocation pattern for the data field that is indicated by the resource allocation field; and transmitting a WLAN preamble that includes the WLAN signaling field.

2. The method of claim 1, wherein generating the common user field comprises:

generating the resource allocation field to include a first portion and a second portion, each of the first portion and the second portion including an indicator of a type of resource allocation information that is included in the respective first portion and the respective second portion.

3. The method of claim 2, wherein the indicator comprises an allocation plan indicator or a resource type indicator.

4. The method of claim 3, further comprising:

identifying that the one or more communication resource units in the MU-PPDU are associated with an MU-MIMO transmission or an OFDMA single-user transmission based at least in part on the allocation plan indicator and the resource type indicator.

5. The method of claim 3, further comprising:

identifying a size of the one or more communication resource units, a number of users associated with an MU-MIMO transmission, or any combination thereof based at least in part on the allocation plan indicator and the resource type indicator.

6. The method of claim 3, wherein generating the resource allocation field further comprises:

including an index with the allocation plan indicator, the index associated with a resource unit allocation plan for the one or more communication resource units.

7. The method of claim 3, wherein generating the resource allocation field further comprises:

including an index with the resource type indicator, the index associated with a number of users of the one or more communication resource units.

8. The method of claim 3, further comprising:

identifying that the one or more communication resource units in the MU-PPDU are for OFDMA single-user transmissions when the indicator of the first portion and the indicator of the second portion are both allocation plan indicators.

9. The method of claim 8, wherein generating the resource allocation field further comprises:

including an index with both allocation plan indicators if a size of the one or more communication resource units is less than a predetermined threshold.

10. The method of claim 8, wherein generating the resource allocation field further comprises:

including an index with only one of the allocation plan indicators if a size of the one or more communication resource units is equal to or greater than a predetermined threshold.

11. The method of claim 3, further comprising:

identifying that the one or more communication resource units are for MU-MIMO transmissions when at least one of the indicator of the first portion or the indicator of the second portion is the resource type indicator.

12. The method of claim 11, wherein generating the resource allocation field further comprises:

including the resource type indicator with both the first portion and the second portion if a size of the one or more communication resource units is less than a predetermined threshold.

13. The method of claim 11, wherein generating the resource allocation field further comprises:

including the allocation plan indicator with one of the first portion and the second portion, and including the resource type indicator with another of the first portion and the second portion if a size of the one or more communication resource units is less than a predetermined threshold.

14. The method of claim 1, wherein generating the common user field comprises:

generating the resource allocation field to include a first resource allocation plan portion and a second user number portion.

15. The method of claim 1, wherein the at least one station-specific field is associated with an OFDMA single-user transmission in the MU-PPDU and comprises a station identification field, a modulation and coding scheme field, a coding field, a number of scheduled streams field, and space time block code field, and a transmit beamforming field.

16. The method of claim 1, wherein the at least one station-specific field is associated with an MU-MIMO transmission and comprises a station identification field, a modulation and coding scheme field, a coding field, a number of scheduled streams field, and a stream index.

17. The method of claim 1, further comprising:

generating a center station-specific field at a center position between a first station-specific field and a second station-specific field of the at least one station-specific field, wherein the center position of the center station-specific field identifies a center communication resource unit in the MU-PPDU.

18. The method of claim 1, further comprising:

generating a center station-specific field at a last position of the WLAN signaling field that follows the at least one station-specific field, wherein the last position of the center station-specific field identifies a center communication resource unit in the MU-PPDU.

19. The method of claim 1, wherein an order of the at least one station-specific field within the WLAN signaling field identifies the position of one of the one or more communication resource units of the resource unit allocation pattern indicated by the resource allocation field.

20. A method of communication at a station, comprising:

receiving a wireless local area network (WLAN) preamble that comprises a common user field in a WLAN signaling field and at least one station-specific field in the WLAN signaling field;

identifying a resource allocation field associated with the common user field indicating one or more communication resource units of a data field in a multi-user (MU) physical layer protocol data unit (PPDU) (MU-PPDU) and further indicating that the one or more communication resource units are associated with an MU multi-input multi-output (MIMO) transmission or an orthogonal frequency division multiple access (OFDMA) single-user transmission; and identifying a station-specific field of the at least one station-specific field associated with the station and at least one communication resource unit of the one or more communication resource units of the data field in the MU-PPDU corresponding to the station-specific field based at least in part on a position of the station-specific field within the WLAN signaling field included in the WLAN preamble.

21. The method of claim 20, further comprising:
identifying a size of the at least one communication resource unit based at least in part on the resource allocation field.

22. The method of claim 20, further comprising:
identifying that the at least one communication resource unit is associated with an MU-MIMO transmission or an OFDMA single-user transmission based at least in part on the resource allocation field.

23. The method of claim 20, further comprising:
identifying a number of users monitoring the at least one communication resource unit associated with an MU-MIMO transmission based at least in part on the resource allocation field.

24. The method of claim 20, further comprising:
identifying a location for the at least one communication resource unit corresponding to the station-specific field based at least in part on the resource allocation field.

25. The method of claim 20, further comprising:
identifying a center station-specific field at a center position between a first station-specific field and a second station specific field of the at least one station-specific field; and
identifying a center communication resource unit in the MU-PPDU corresponding to the center station-specific field based at least in part on identifying the center station-specific field at the center position.

26. The method of claim 20, further comprising:
identifying a center station-specific field at a last position following the at least one station-specific field; and
identifying a center communication resource unit in the MU-PPDU corresponding to the center station-specific field based at least in part on identifying the center station-specific field at the last position.

27. The method of claim 20, wherein identifying the station-specific field of the at least one station-specific field associated with the station and the at least one communication resource unit of the one or more communication resource units in the MU-PPDU corresponding to the station-specific field is based at least in part on an order of the at least one station-specific field within the WLAN preamble.

28. A communications device at an access point, comprising:
a processor and memory communicatively coupled to the processor, the memory comprising computer-readable code that, when executed by the processor, causes the communications device to:
generate a common user field in a wireless local area network (WLAN) signaling field, the common user field decodable by a plurality of stations, and the common user field comprising a resource allocation field indicating one or more communication resource units of a data field in a multi-user (MU) physical layer protocol data unit (PPDU) (MU-PPDU) and further indicating that the one or more communication resource units are associated with an MU multi-input multi-output (MIMO) transmission or an orthogonal frequency division multiple access (OFDMA) single-user transmission;
generate, subsequent to the common user field in the WLAN signaling field, at least one station-specific field in the WLAN signaling field, wherein a position of the at least one station-specific field within the WLAN signaling field identifies a position of one of the one or more communication resource units of a resource unit allocation pattern for the data field that is indicated by the resource allocation field; and
transmit a WLAN preamble that includes the WLAN signaling field.

29. The communications device of claim 28, further comprising code that causes the communications device to:
generate the resource allocation field to include a first portion and a second portion, each of the first portion and the second portion including an indicator of a type of resource allocation information that is included in the respective first portion and the respective second portion.

30. The communications device of claim 29, wherein the indicator comprises an allocation plan indicator or a resource type indicator.

31. A communications device at a station, comprising:
a processor and memory communicatively coupled to the processor, the memory comprising computer-readable code that, when executed by the processor, causes the communications device to:
receive a wireless local area network (WLAN) preamble that comprises a common user field in a WLAN signaling field and at least one station-specific field in the WLAN signaling field;
identify a resource allocation field associated with the common user field indicating one or more communication resource units of a data field in a multi-user (MU) physical layer protocol data unit (PPDU) (MU-PPDU) and further indicating that the one or more communication resource units are associated with an MU multi-input multi-output (MIMO) transmission or an orthogonal frequency division multiple access (OFDMA) single-user transmission; and
identify a station-specific field of the at least one station-specific field associated with the station and at least one communication resource unit of the one or more communication resource units of the data field in the MU-PPDU corresponding to the station-specific field based at least in part on a position of the station-specific field within the WLAN signaling field included in the WLAN preamble.

32. The communications device of claim 31, further comprising code that causes the communications device to:
identify, based at least in part on the resource allocation field, at least:
a size of the at least one communication resource, or
that the at least one communication resource unit is associated with an MU-MIMO transmission, or
that the at least one communication resource unit is associated with an OFDMA single-user transmission, or
a number of users monitoring the at least one communication resource unit associated with an MU-MIMO transmission, or
a combination thereof.

* * * * *